(12) United States Patent
Nakamura et al.

(10) Patent No.: US 8,883,060 B2
(45) Date of Patent: Nov. 11, 2014

(54) METHOD FOR PRODUCING FRP CYLINDER AND FRP CYLINDER

(75) Inventors: Takato Nakamura, Saitama (JP); Norio Matsumoto, Saitama (JP); Naoki Kimoto, Saitama (JP)

(73) Assignee: Fujikura Rubber Ltd., Tokyo (JP)

( * ) Notice: Subject to any disclaimer, the term of this patent is extended or adjusted under 35 U.S.C. 154(b) by 235 days.

(21) Appl. No.: 13/144,778

(22) PCT Filed: Jan. 14, 2010

(86) PCT No.: PCT/JP2010/050300
§ 371 (c)(1),
(2), (4) Date: Jul. 15, 2011

(87) PCT Pub. No.: WO2010/084809
PCT Pub. Date: Jul. 29, 2010

(65) Prior Publication Data
US 2011/0281061 A1    Nov. 17, 2011

(30) Foreign Application Priority Data
Jan. 21, 2009   (JP) .................................. 2009-11142

(51) Int. Cl.
| B29C 53/56 | (2006.01) |
| B29C 70/32 | (2006.01) |
| B29K 101/10 | (2006.01) |
| B29K 105/24 | (2006.01) |
| B29L 23/00 | (2006.01) |

(52) U.S. Cl.
CPC ............ *B29C 70/32* (2013.01); *B29K 2101/10* (2013.01); *B29K 2105/246* (2013.01); *B29L 2023/22* (2013.01)
USPC ......................................... 264/258; 156/173

(58) Field of Classification Search
USPC ........................... 264/258; 156/173, 169, 171
See application file for complete search history.

(56) References Cited

U.S. PATENT DOCUMENTS 3,508,677 A * 4/1970 Laibson et al. ................ 220/590
3,607,495 A * 9/1971 Davis, Jr. ......................... 156/86
(Continued)

FOREIGN PATENT DOCUMENTS

| JP | 6-023558 | 3/1994 |
| JP | H08-224808 A | 9/1996 |

(Continued)

OTHER PUBLICATIONS

Machine Translation of JP 11-76478 A to Mizuno published Mar. 23, 1999.*
(Continued)

*Primary Examiner* — Matthew Daniels
(74) *Attorney, Agent, or Firm* — McCormick, Paulding & Huber LLP

(57) ABSTRACT

A method is provided for producing a weight-reduced FRP cylinder which can attain high strength, and also such an FRP cylinder is provided. This FRP cylinder producing method, in which a plurality of prepregs formed by impregnating reinforced fibers with thermosetting resin sheets are wound into a cylinder and thermally cured to be formed as a plurality of FRP layers, includes a simultaneous multilayer winding process in which a torsional rigidity retaining prepreg and a buckling prevention prepreg are continuously wound a plurality of turns with being layered on each other when the plurality of prepregs are wound into a cylinder, wherein the torsional rigidity retaining prepreg includes a layer of fibers oblique to a cylindrical axis direction of the FRP cylinder, and wherein the buckling prevention prepreg includes a layer of fibers orthogonal to the cylindrical axis direction.

4 Claims, 23 Drawing Sheets

(56) References Cited

U.S. PATENT DOCUMENTS

| | | | | |
|---|---|---|---|---|
| 3,775,219 | A | * | 11/1973 | Karlson et al. ............... 156/363 |
| 4,089,190 | A | * | 5/1978 | Worgan et al. ............... 464/180 |
| 4,171,626 | A | * | 10/1979 | Yates et al. ................... 464/181 |
| 4,172,175 | A | * | 10/1979 | Pearson et al. ............... 428/376 |
| 4,173,670 | A | * | 11/1979 | VanAuken ................... 138/123 |
| 4,571,355 | A | * | 2/1986 | Elrod ........................... 428/102 |
| 5,597,631 | A | * | 1/1997 | Furumoto et al. ........... 428/36.4 |
| 5,792,295 | A | * | 8/1998 | Huebner et al. ............. 156/197 |
| 2008/0070716 | A1 | | 3/2008 | Kumamoto |
| 2008/0268192 | A1 | | 10/2008 | Suzuki |

FOREIGN PATENT DOCUMENTS

| | | |
|---|---|---|
| JP | 11-076478 A | 3/1999 |
| JP | 2000-245880 A | 9/2000 |
| JP | 2001-096635 A | 4/2001 |
| JP | 2001-205710 A | 7/2001 |
| JP | 2004-121402 A | 4/2004 |
| JP | 2006-062355 A | 3/2006 |
| JP | 2006-262743 A | 10/2006 |
| JP | 2007-185253 A | 7/2007 |
| JP | 2008-080555 A | 4/2008 |
| JP | 2008-093944 A | 4/2008 |
| JP | 2008-148757 A | 7/2008 |
| JP | 2008-271875 A | 11/2008 |

OTHER PUBLICATIONS

Weaver et al., Anisotropic effects in the compression buckling of laminated composite cylindrical shells, Composites Science and Technology, vol. 62 (2002), pp. 91-105.*

Weaver, P.M., J.R. Driesen, P. Roberts, The effect of flexural/twist anisotropy on compression buckling of quasi-isotropic laminated cylindrical shells, Composite Structures, vol. 55 (2002), pp. 195-204.*

Weaver, P.M., J.R. Driesen, P. Roberts, Anisotropic effects in the compression buckling of laminated composite cylindrical shells, Composites Science and Technology, vol. 62 (2002), pp. 91-105.*

Swanson, S.R., A.P. Christoforou, G.E. Colvin Jr., Biaxial Testing of Fiber Composites Using Tubular Specimens, Experimental Mechanics (Sep. 1988), pp. 238-243.*

International search report for PCT/J132010/050300 dated Apr. 1, 2010.

* cited by examiner

←— Cylindrical Axis Direction —→

Fig.21

| Innermost Layer | 1 | 2 | 3 | 4 | 5 | 6 | 7 | 8 | 9 | 10 | 11 | 12 | 13 | 14 | 15 | 16 | 17 | 18 | Outermost Layer |
|---|---|---|---|---|---|---|---|---|---|---|---|---|---|---|---|---|---|---|---|
| Type A | +45° | −45° | 90° | +45° | −45° | 90° | +45° | −45° | 90° | +45° | −45° | 90° | +45° | −45° | 90° | +45° | −45° | 90° | |
| Type B | +45° | −45° | 90° | +45° | −45° | 90° | +45° | −45° | 90° | +45° | −45° | 90° | +45° | −45° | 90° | +45° | −45° | 90° | |
| Type C | +45° | +45° | +45° | −45° | 90° | 90° | +45° | −45° | +45° | −45° | 90° | 90° | +45° | −45° | +45° | −45° | 90° | 90° | |
| Type D | +45° | −45° | +45° | −45° | +45° | −45° | +45° | −45° | +45° | −45° | +45° | −45° | 90° | 90° | 90° | 90° | 90° | 90° | |

Fig.22

| Innermost Layer | 1 | 2 | 3 | 4 | 5 | 6 | 7 | 8 | 9 | 10 | 11 | 12 |
|---|---|---|---|---|---|---|---|---|---|---|---|---|
| Type E | 0° | +45° | −45° | 90° | 0° | +45° | −45° | 90° | 0° | +45° | −45° | 90° |

| | 13 | 14 | 15 | 16 | 17 | 18 | 19 | 20 | Outermost Layer | | | |
|---|---|---|---|---|---|---|---|---|---|---|---|---|
| Type E | 0° | +45° | −45° | 90° | 0° | +45° | −45° | 90° | | | | |

| Innermost Layer | 1 | 2 | 3 | 4 | 5 | 6 | 7 | 8 | 9 | 10 | 11 | 12 |
|---|---|---|---|---|---|---|---|---|---|---|---|---|
| Type F | +45° | 0° | −45° | 90° | +45° | 0° | −45° | 90° | +45° | 0° | −45° | 90° |

| | 13 | 14 | 15 | 16 | 17 | 18 | 19 | 20 | Outermost Layer | | | |
|---|---|---|---|---|---|---|---|---|---|---|---|---|
| Type F | +45° | 0° | −45° | 90° | +45° | 0° | −45° | 90° | | | | |

| Innermost Layer | 1 | 2 | 3 | 4 | 5 | 6 | 7 | 8 | 9 | 10 | 11 | 12 |
|---|---|---|---|---|---|---|---|---|---|---|---|---|
| Type G | 0° | 0° | +45° | −45° | +45° | −45° | 90° | 90° | 0° | 0° | 0° | +45° |

| | 13 | 14 | 15 | 16 | 17 | 18 | 19 | 20 | Outermost Layer | | | |
|---|---|---|---|---|---|---|---|---|---|---|---|---|
| Type G | −45° | +45° | −45° | +45° | −45° | 90° | 90° | 90° | | | | |

Fig.23

| Inner-most Layer | 1 | 2 | 3 | 4 | 5 | 6 | 7 | 8 | 9 | 10 | 11 | 12 | Outer-most Layer |
|---|---|---|---|---|---|---|---|---|---|---|---|---|---|
| Type H | 0° | +45° | −45° | 90° | 0° | +45° | −45° | 90° | 0° | +45° | −45° | 90° | |
| Type I | 0° | 0° | 0° | +45° | −45° | +45° | −45° | +45° | −45° | 90° | 90° | 90° | |

METHOD FOR PRODUCING FRP CYLINDER AND FRP CYLINDER

CROSS REFERENCE TO RELATED APPLICATIONS

This application claims the priority of Japanese patent application No. 2009-11142, filed on Jan. 21, 2009 and PCT Application No. PCT/JP2010/050300, filed on Jan. 14, 2010, the disclosures of which are incorporated herein by reference in their entirety.

TECHNICAL FIELD OF THE INVENTION

The present invention relates to a method for producing an FRP (Fiber Reinforced Plastics) cylinder, and to an FRP cylinder.

BACKGROUND OF THE INVENTION

In recent years, FRP (Fiber Reinforced Plastics) cylinders have been used in various industrial fields. As a method for producing an FRP cylinder, a filament winding method (in Japanese Unexamined Patent Publication No. 2006-62355) in which carbon fibers are wound around a mandrel while being impregnated with a resin and a prepreg method (in Japanese Unexamined Patent Publication No. 2001-96635) in which a plurality of prepregs, each of which is made from carbon fibers impregnated with a thermosetting resin sheet, are wound and thermally cured to be formed as a plurality of FRP layers, are known in the art.

Problem to be Solved by the Invention

However, an FRP cylinder produced according to the filament winding method requires more than a specified quantity of resin and there is an upper limit in volume content of carbon fibers, thus having a problem of not being capable of sufficiently meeting the demands for weight reduction and strength improvement of the FRP cylinder.

On the other hand, an FRP cylinder produced according to the prepreg method generally has a feature capable of increasing the volume content of carbon fibers even with a minimum necessary amount of resin, thus being advantageous in achieving weight reduction and strength improvement of the FRP cylinder at the same time. However, in the case where an FRP cylinder produced according to the prepreg method is used as a propeller shaft or a drive shaft for an automobile (two wheeler), the FRP cylinder is required to have a high level of strength (torsional rigidity, crush rigidity, and fatigue strength, etc.) against both a force (torsion) which is exerted on the FRP cylinder in a direction oblique thereto and a force (buckling) exerted on the FRP cylinder in a direction orthogonal thereto, thus having room for improvement.

The present invention has been devised in view of the awareness of the above described issues, and an object of the present invention is to provide a method for producing a weight-reduced FRP cylinder which can attain high strength and also provide such an FRP cylinder.

SUMMARY OF THE INVENTION

As a result of analyzing conventional FRP cylinders, the inventors of the present invention have discovered that, in general, a conventional FRP cylinder is made by winding prepregs in mutually different fiber directions by a plurality of turns; however, since fibers (fiber layers) adjacent to one another in the internal/external direction of the FRP cylinder of prepregs adjacent to each other are isolated from each other, upon a force being exerted on the FRP cylinder among fibers adjacent to each other in the internal/external direction of the FRP cylinder, it is difficult for a force which suppresses deformation of these fibers to act. In addition, although the same prepreg has been continuously wound by a plurality of turns, it is difficult for the deformation suppression effect to act in a similar manner when this prepreg that has been wound a plurality of turns is thermally cured because the directions of fibers adjacent to one another in the internal/external direction of the FRP cylinder are mutually the same. The inventors reached a conclusion that these are the reasons why conventional FRP cylinders cannot demonstrate sufficient strength, and hence, leading them to the conception of the present invention.

Specifically, the present invention has been devised from the following viewpoint: in an FRP cylinder made by winding prepregs mutually different in fiber direction, this FRP cylinder always includes a torsion rigidity retaining prepreg containing reinforced fibers oblique to the longitudinal direction of the FRP cylinder (oblique fibers) and a buckling (collapse) prevention prepreg containing reinforced fibers orthogonal to the longitudinal direction of the FRP cylinder (orthogonal fibers), and accordingly, if the oblique fibers and the orthogonal fibers are continuously wound a plurality of turns in a mutually adjacent state, fibers (fiber layer) extending in one direction and other fibers (fiber layer) extending in another direction can be made to be adjacently layered in the internal/external direction two or more turns. Consequently, the inner and outer fiber layers mutually deter deformation thereof, thus being capable of improving the strength. In other words, if orthogonal fibers (oblique fibers) and the oblique fibers (orthogonal fibers) are layered and wound by two or more turns (to form a simultaneously-wound multilayer/a multiple wound layer/a set wound layer) with the orthogonal fibers (oblique fibers) sandwiched between the oblique fibers (orthogonal fibers), the strength of the FRP cylinder can be improved since it is conceivable that adjacent fiber layers mutually collaboratively resist deformation upon an external force being applied to the FRP cylinder.

A method for producing an FRP cylinder according to the present invention is characterized in that a plurality of prepregs formed by impregnating reinforced fibers with thermosetting resin sheets are wound into a cylinder and thermally cured to be formed as a plurality of FRP layers, the method including a simultaneous multilayer winding process in which a torsional rigidity retaining prepreg and a buckling prevention prepreg are continuously wound by a plurality of turns while being layered on each other when the plurality of prepregs are wound into a cylinder, wherein the torsional rigidity retaining prepreg includes a layer of fibers oblique to a cylindrical axis direction of the FRP cylinder, and wherein the buckling prevention prepreg includes a layer of fibers orthogonal to the cylindrical axis direction.

With this configuration, an FRP cylinder which is high in strength with respect to the torsional direction and the buckling direction can be obtained, which is suitable for use as a propeller shaft or a drive shaft for an automobile.

In the simultaneous multilayer winding process, the torsional rigidity retaining prepreg and the buckling prevention prepreg are continuously wound by the plurality of turns with a bending rigidity retaining prepreg which includes a layer of fibers parallel to the cylindrical axis direction being further layered on the torsional rigidity retaining prepreg and the buckling prevention prepreg.

With this configuration, an FRP cylinder can be obtained which has strength with respect to the bending direction together with strength with respect to the torsional direction and the buckling direction, and is suitable for use as a stabilizer bar or an anti-roll bar for an automobile.

It is desirable for the simultaneous multilayer winding process to be performed at least two times. It is desirable for the simultaneous multilayer winding process to be performed at least two times alternately in mutually opposed winding directions.

It is desirable that the simultaneous multilayer winding process be performed with a separating sheet (e.g., a PTFE film or a PFA film) sandwiched between adjacent prepregs (the torsional rigidity retaining prepreg and the buckling prevention prepreg, the torsional rigidity retaining prepreg and the bending rigidity retaining prepreg, or the buckling prevention prepreg and the bending rigidity retaining prepreg) in a layered state, and that the separating sheet be removed during the operation of the simultaneous multilayer winding process.

It is desirable that each prepreg (the torsional rigidity retaining prepreg and the buckling prevention prepreg, and also the bending rigidity retaining prepreg) wound in the simultaneous multilayer winding process be the same length in the cylindrical axis direction, and that the prepregs be overlaid one over another throughout the length of the FRP cylinder in the cylindrical axis direction. In regard to FRP cylinders having a conventional structure, it is typical to insert a buckling prevention prepreg, for preventing cross sections of the FRP cylinder from buckling, into a part of the FRP cylinder by a small amount in the cylindrical axis direction, and accordingly, problems may occur such as the buckling prevention prepreg not being easily inserted and the product being distorted. In the present invention, by reexamining such conventional common technical knowledge, problems such as the buckling prevention prepreg not being easily inserted and the product being distorted can be resolved by making the buckling prevention prepreg and the torsion rigidity retaining prepreg (the bending rigidity retaining prepreg) the same length in the cylindrical axis direction and by continuously winding these prepregs by a plurality of turns.

An FRP cylinder according to the present invention is characterized by being provided with a plurality of prepregs which are formed by impregnating reinforced fibers with thermosetting resin sheets and which are wound into a cylinder and thermally cured to be formed as a plurality of FRP layers, wherein the plurality of FRP layers comprise a simultaneously-wound multilayer which is configured from a set prepreg that is continuously wound by a plurality of turns and thermally cured, wherein the set prepreg comprises a torsional rigidity retaining prepreg and a buckling prevention prepreg which are layered on each other, wherein the torsional rigidity retaining prepreg includes a layer of fibers oblique to a cylindrical axis direction of the FRP cylinder, and wherein the buckling prevention prepreg includes a layer of fibers orthogonal to the cylindrical axis direction.

It is practical for the torsional rigidity retaining prepreg to include a pair of bias prepregs filament fiber directions which are oblique to the cylindrical axis direction at angles of $\pm\alpha$ degrees ($0<\alpha<90$), and for the buckling prevention prepreg to includes a hoop prepreg, a filament fiber direction of which is orthogonal to the cylindrical axis direction. In this case, it is desirable that the filament fiber directions of the pair of bias prepregs be oblique to the cylindrical axis direction at angles of $\pm30$ degrees, $\pm45$ degrees or $\pm60$ degrees.

The set prepreg can further include a bending rigidity retaining prepreg layered on the torsional rigidity retaining prepreg and the buckling prevention prepreg, the bending rigidity retaining prepreg having a layer of fibers parallel to the cylindrical axis direction. In this case, it is practical for the bending rigidity retaining prepreg to be a 0-degree prepreg, a filament fiber direction of which is parallel to the cylindrical axis direction.

Alternatively, it is possible for the torsional rigidity retaining prepreg to include a plain weave fabric prepreg, a triaxial woven fabric prepreg or a tetra-axial woven fabric prepreg, wherein the plain weave fabric prepreg is made of a plain weave fabric impregnated with a thermosetting resin sheet and includes a layer of fibers oblique to the cylindrical axis direction, wherein the triaxial woven fabric prepreg is made of a triaxial woven fabric impregnated with a thermosetting resin sheet and includes a layer of fibers oblique to the cylindrical axis direction, and wherein the tetra-axial woven fabric prepreg is made of a tetra-axial woven fabric impregnated with a thermosetting resin sheet and includes a layer of fibers oblique to the cylindrical axis direction. Furthermore, the buckling prevention prepreg can include a plain weave fabric prepreg or a tetra-axial woven fabric prepreg, wherein the plain weave fabric prepreg is made of a plain weave fabric impregnated with a thermosetting resin sheet and includes a layer of fibers orthogonal to the cylindrical axis direction, and wherein the tetra-axial woven fabric prepreg is made of a tetra-axial woven fabric impregnated with a thermosetting resin sheet and includes a layer of fibers orthogonal to the cylindrical axis direction.

It is desirable for the set prepreg to be continuously wound by three or more turns into a cylinder.

It is desirable for the plurality of FRP layers to include at least two of the simultaneously-wound multilayers. In such a case, it is desirable for at least two set prepregs respectively forming the simultaneously-wound multilayers to be wound alternately in mutually opposed winding directions.

It is desirable for the plurality of FRP layers to include a burst prevention layer as an outermost layer thereof which is made from a hoop prepreg, a filament fiber direction of which is orthogonal to the cylindrical axis direction.

It is desirable that each prepreg (the torsional rigidity retaining prepreg and the buckling prevention prepreg, and also the bending rigidity retaining prepreg) of the set prepreg have the same length in the cylindrical axis direction, and that the prepregs of the set prepreg are overlaid one over another throughout the length of the FRP cylinder in the cylindrical axis direction.

Effects of the Invention

According to the present invention, since the method includes the simultaneous multilayer winding process, in which a torsional rigidity retaining prepreg and a buckling prevention prepreg are continuously wound by a plurality of turns while being layered on each other when the plurality of prepregs are wound into a cylinder, wherein the torsional rigidity retaining prepreg includes a layer of fibers oblique to a cylindrical axis direction of the FRP cylinder, and wherein the buckling prevention prepreg includes a layer of fibers orthogonal to the cylindrical axis direction, an FRP cylinder which is high in strength with respect to the torsional direction and the buckling direction can be obtained. In addition, weight reduction and strength improvement of the FRP cylinder can be carried out since it is possible to increase the quantity of the reinforced fibers by reducing the quantity of resin included in the torsional rigidity retaining prepreg and the buckling prevention prepreg that comprise the set prepreg.

BRIEF DESCRIPTION OF THE DRAWINGS

FIG. 21 is a first diagram for illustrating the multilayer winding structure of a prepreg in each FRP cylinder manufactured for trial in a practical example;

FIG. 22 is a second diagram for illustrating the multilayer winding structure of a prepreg in each FRP cylinder manufactured for trial in a practical example; and FIG. 23 is a third diagram for illustrating the multilayer winding structure of a prepreg in each FRP cylinder manufactured for trial in a practical example.

DESCRIPTION OF THE PREFERRED EMBODIMENTS

First Embodiment

Figure 1:
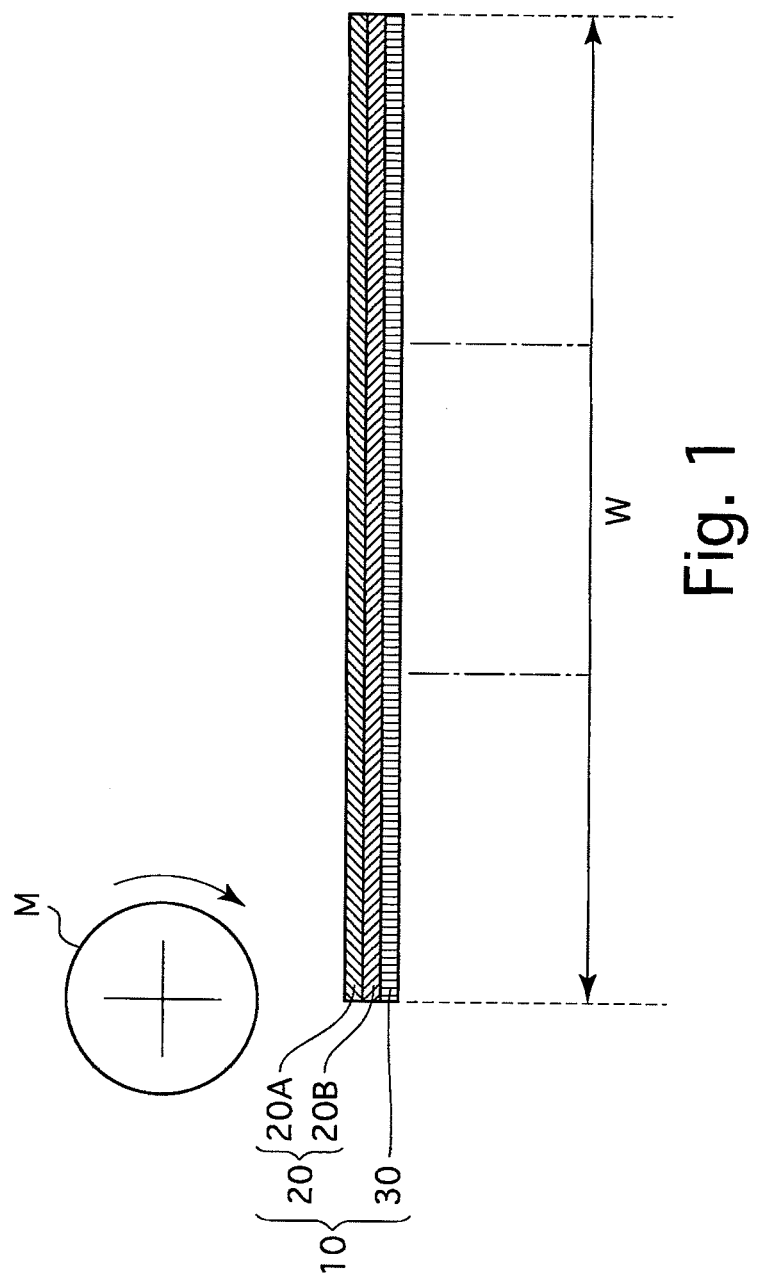
FIG. 1 is an illustration showing a simultaneously-multilayered winding layer included in an FRP cylinder pertaining to a first embodiment of the present invention.

FIG. 1 is an illustration showing a simultaneously-wound multilayer 10 included in an FRP cylinder 100 (FIG. 4) pertaining to a first embodiment of the present invention. The FRP cylinder 100 is made by winding a plurality of prepregs, each of which is made by impregnating a thermosetting resin sheet with reinforced fibers, into a cylinder and thermally curing the plurality of prepregs thus wound, to thereby be composed of a plurality of FRP layers. In FIG. 1, only the simultaneously-wound multilayer 10 that is included in this plurality of FRP layers is shown for the sake of making the present invention easier to understand.

The simultaneously-wound multilayer 10 is provided with a torsional rigidity retaining layer 20 which has strength to withstand a force (torsion) exerted on the FRP cylinder 100 in directions oblique to the axial direction of the FRP cylinder 100 (hereinafter referred to as "cylindrical axis direction") and a buckling prevention layer 30 which has strength to withstand a force (buckling) exerted on the FRP cylinder 100 in directions orthogonal to the cylindrical axis direction. The torsional rigidity retaining layer 20 consists of a pair of bias layers 20A and 20B.

Figure 2:
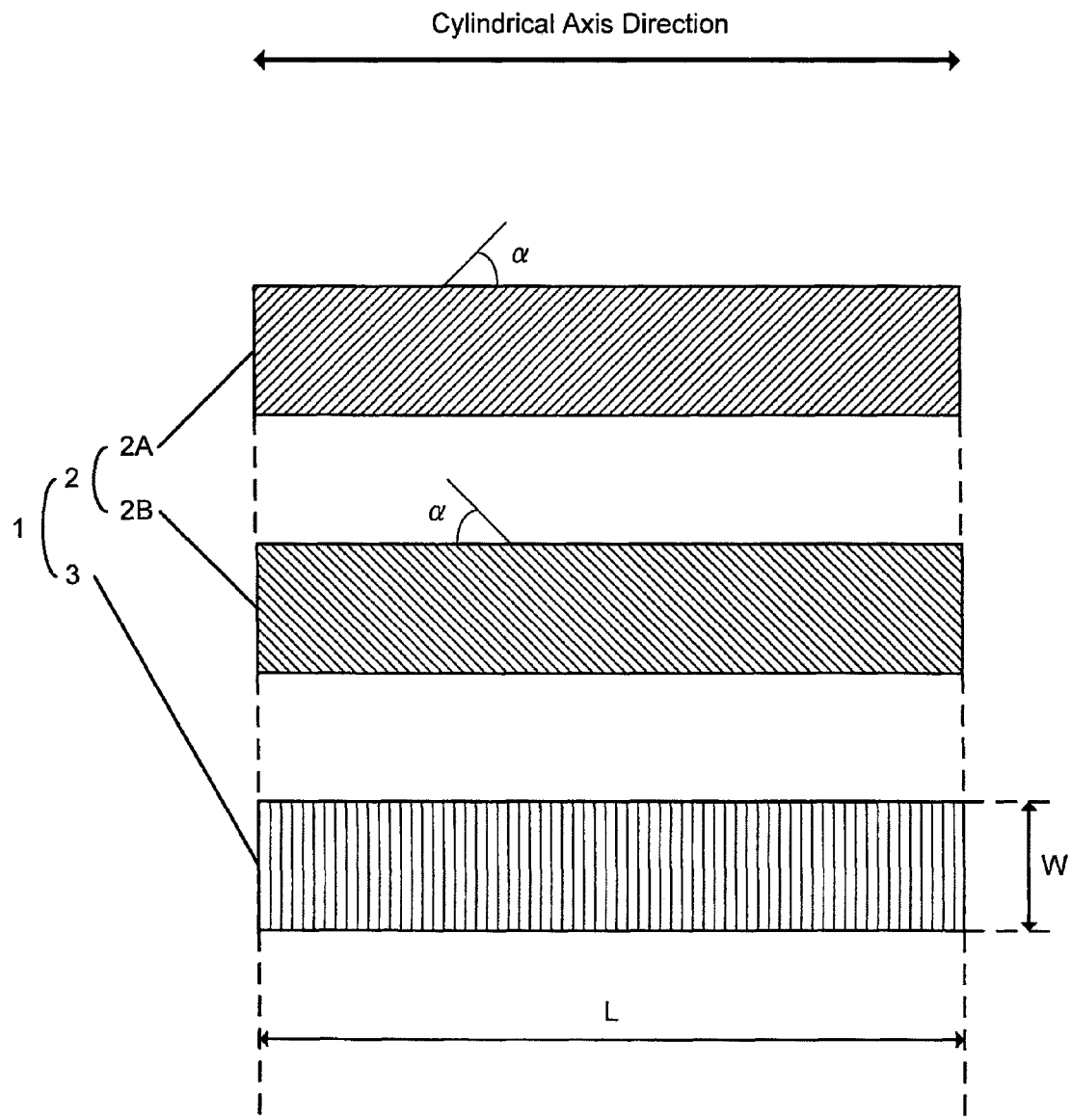
FIG. 2 is an illustration showing the structure of a set prepreg which comprises the simultaneously-multilayered winding layer shown in FIG. 1.

More specifically, the simultaneously-wound multilayer 10 is configured from a set prepreg 1 which consists of a torsional rigidity retaining prepreg 2 and a buckling prevention prepreg 3 that are layered in that order from the bottom layer (inner side) as shown in FIG. 2, and which is continuously wound a plurality of turns and thermally cured, wherein the torsional rigidity retaining prepreg 2 includes a layer of fibers oblique to the cylindrical axis direction and the buckling prevention prepreg 3 includes a layer of fibers orthogonal to the cylindrical axis direction. FIG. 2 illustrates a state of the set prepreg 1 before the torsional rigidity retaining prepreg 2 and the buckling prevention prepreg 3 are layered on each other to show the fiber direction of each of the torsional rigidity retaining prepreg 2 and the buckling prevention prepreg 3 that constitute the set prepreg 1. Note that the upper-and-lower (internal-and-external) positional relationship between the prepregs is flexible; it is possible to make the set prepreg 1 by layering the buckling prevention prepreg 3 and the torsional rigidity retaining prepreg 2 in that order from the bottom layer (inner side).

The torsional rigidity retaining prepreg 2 becomes the torsional rigidity retaining layer 20 by being thermally cured; in this embodiment, the torsional rigidity retaining prepreg 2 is composed of a pair of bias prepregs 2A and 2B, the filament fiber directions of which are oblique to the cylindrical axis direction at angles of $\pm\alpha$ degrees ($0<\alpha<90$). The angles $\alpha$ are, e.g., $\pm 30$ degrees, $\pm 45$ degrees or $\pm 60$ degrees. The buckling prevention prepreg 3 becomes the buckling prevention layer 30 by being thermally cured and is a hoop prepreg, the filament fiber direction of which is orthogonal to the cylindrical axis direction.

The width W of the set prepreg 1 (the torsional rigidity retaining prepreg 2 and the buckling prevention prepreg 3) is set at approximately three times of the circumference of the set prepreg 1 wound into a cylinder, and the set prepreg 1 can be continuously wound three turns into a cylinder. Since the set prepreg 1 consists of three prepregs: the pair of bias prepregs 2A and 2B and the hoop prepreg 3, the number of plies becomes nine in total by continuously winding the set prepreg 1 three turns into a cylinder. The set prepreg 1 (the torsional rigidity retaining prepreg 2 and the buckling prevention prepreg 3) has the same (isometric) length L in the cylindrical axis direction, and the torsional rigidity retaining prepreg 2 and the buckling prevention prepreg 3 are overlaid onto each other throughout the length of the set prepreg 1 in the cylindrical axis direction. Note that the length L corresponds to the length of the FRP cylinder 100 and is designed in accordance with the usage of the FRP cylinder 100.

Figure 3:
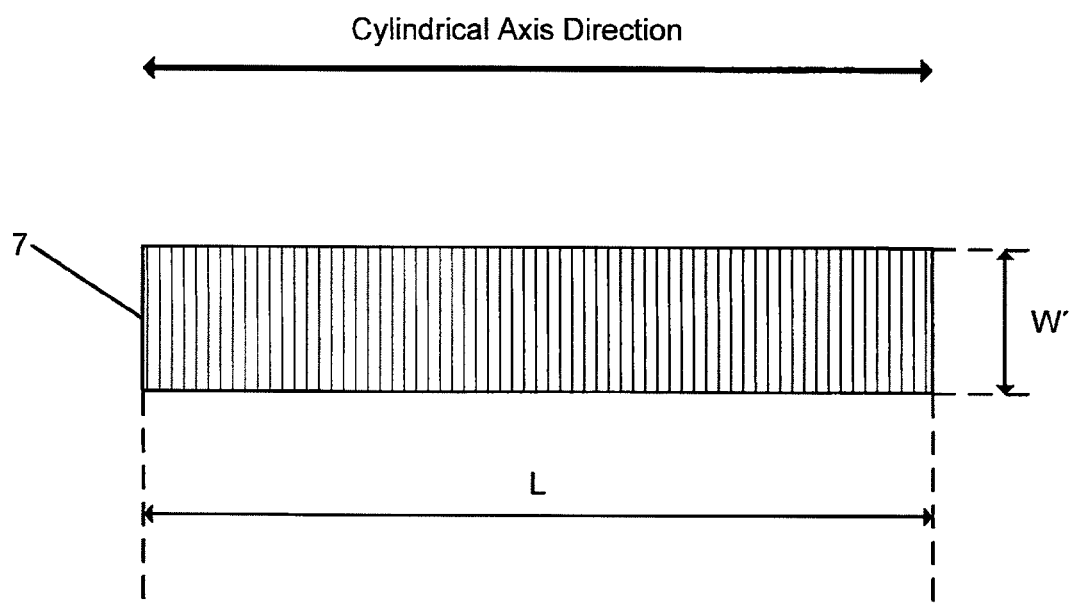
FIG. 3 is an illustration showing the structure of a burst prevention prepreg.

Various prepregs are wound on the inside and outside of the set prepreg 1 depending on the usage of the FRP cylinder 100, and such various prepregs become FRP layers other than the simultaneously-wound multilayer 10 by being thermally cured. For instance, it is desirable for the outermost layer of the plurality of FRP layers of the FRP cylinder 100 to constitute a burst prevention layer which is made by thermally curing a burst prevention prepreg 7 (hoop prepreg), the filament fiber direction of which is orthogonal to the cylindrical axis direction (FIG. 3). This burst prevention layer prevents the FRP cylinder 100 from bursting upon being compressed by buckling and enhances the strength of the FRP cylinder 100 with respect to the buckling direction. The width W' of the burst prevention prepreg 7 is designed depending upon the number of turns (the number of plies) thereof. In addition, a bending stress retaining layer (axial direction compression prevention layer) made by thermally curing a 0-degree prepreg the filament fiber direction of which is parallel to the cylindrical axis direction can also be installed on any of the plurality of FRP layers.

Besides carbon fiber, alumina fiber, aramid fiber, Tyranno Fiber, amorphous fiber, glass fiber or the like can be used as the reinforced fibers which are included in the various prepregs including the aforementioned torsional rigidity retaining prepreg 2, buckling prevention prepreg 3 and burst prevention prepreg 7 (the 0-degree prepreg). In other words, the thread type is not basically limited to a particular type.

In the case of a one-direction fiber reinforced prepreg (i.e., prepreg in which the directions of filament fibers are aligned in one direction) such as the torsional rigidity retaining prepreg 2 (the pair of bias prepregs 2A and 2B), the buckling prevention (hoop) prepreg 3 or the burst prevention (hoop) prepreg 7, the thread thickness is desirably smaller than 24K (1K=1,000 filaments). If the thread thickness exceeds 24K, a uniform fabric property may not be ensured; in addition, the workability of winding the prepreg around a mandrel during manufacturing may deteriorate.

The resin with which such a reinforced fabric is impregnated can be basically any type. For instance, epoxy resin, unsaturated polyester resin, phenolic resin, vinyl ester resin, peek resin, polyimide resin, or the like, can be used.

It is desirable that the weight of each prepreg be smaller than 300 g/m²; more desirably, smaller than 250 g/m². If the weight exceeds 300 g/m², the prepreg becomes excessively thick, thus becoming difficult to wind around a mandrel during manufacture. The amount of resin included in each prepreg is desirably in the range of 20 to 45 percent by weight; more desirably, 25 to 40 percent by weight. If the resin content is under 20 percent by weight, a shaft having a sufficient strength may not be able to be produced because of the excessively small amount of resin. If the resin content exceeds 45 percent by weight, the torsional rigidity may deteriorate compared to the case of a cylinder having the same weight.

The FRP cylinder 100 that is configured as described above can be enhanced in strength with respect to torsional direction and buckling direction because the simultaneously-wound multilayer 10, which is configured from the set prepreg 1 (consisting of the torsional rigidity retaining prepreg 2 and the buckling prevention prepreg 3 layered on each other) continuously wound a plurality of turns and thermally cured (wherein the torsional rigidity retaining prepreg 2 includes a layer of fibers oblique to the cylindrical axis direction and the buckling prevention prepreg 3 includes a layer of fibers orthogonal to the cylindrical axis direction), is made to be included between a plurality of FRP layers comprising the body of the FRP cylinder 100. The FRP cylinder 100 having such a structure is suitable for use as a propeller shaft or a drive shaft for an automobile.

In addition, since three prepregs, i.e., the pair of bias prepregs 2A and 2B and the hoop prepreg 3, are layered and then wound while being macroscopically regarded as a single prepreg (the set prepreg 1), manifestation of the buckling prevention effect makes it possible to achieve a weight reduction and a strength improvement of the FRP cylinder 100 at the same time, compared with the case where materials of the same weight are individually wound.

Next, a method for producing the FRP cylinder 100 that is configured as described above will be discussed hereinafter. The producing method which will be discussed hereinafter is merely an example; various modifications may be made without departing from the spirit and scope of the present invention.

A plurality of prepregs, including the set prepreg 1 which are each made from carbon fibers impregnated with a thermosetting resin sheet, are wound around the periphery of a rod-shaped (column-shaped) mandrel (hereinafter referred to as "mandrel") M made of a metallic material. Namely, prepregs are wound around the periphery of the mandrel M to be multilayered thereon in order from a prepreg which forms the innermost FRP layer of the FRP cylinder 100 to a prepreg which forms the outermost FRP layer of the FRP cylinder 100. It is desirable that this multi-layering operation be carried out in a predetermined preheated state, thereby making it possible to wind the prepregs around the mandrel M in a manner so that adjacent prepregs are layered closely on each other.

Upon completion of the winding of all the prepregs around the mandrel M, a shrink tape or the like is wound on the prepregs under tension, and the prepregs are thermally cured with a heating apparatus (e.g., an oven) with an external pressure applied to the prepregs. It is desirable that this heating and curing process be carried out in a vacuum (e.g., in an autoclave). Accordingly, the plurality of prepregs wound around the mandrel M are thermally cured into an integrated FRP cylinder. Namely, the set prepreg 1 is thermally cured to become the simultaneously-wound multilayer 10.

Figure 4:
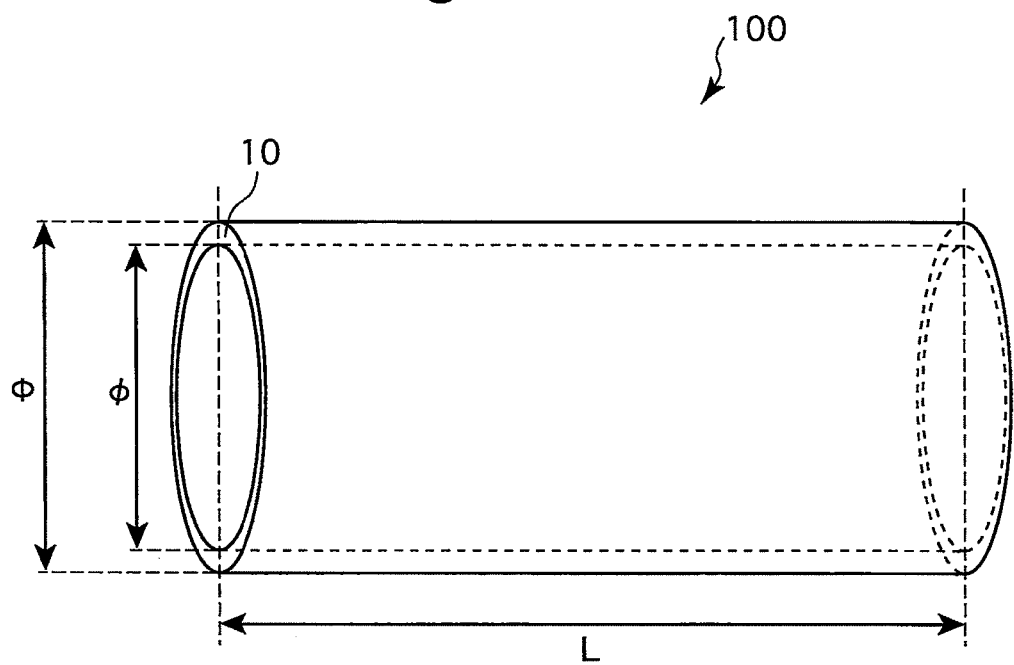
FIG. 4 is an illustration showing the structure of an FRP cylinder made by thermally curing a cylindrically wound prepreg into FRP layers.

Subsequently, by pulling out the mandrel M, the FRP cylinder 100, which has an inner diameter φ that corresponds to the outer diameter of the mandrel M, an outer diameter Φ that corresponds to the inner diameter φ to which the thickness of the plurality of FRP layers is added and a length L that corresponds to the length of the prepregs, is completed (FIG. 4).

According to the present embodiment of the method for producing an FRP cylinder, a process of continuously winding the set prepreg 1, which consists of the torsional rigidity retaining prepreg 2 (the pair of bias prepregs 2A and 2B) and the buckling prevention prepreg (hoop prepreg) 3 that are layered on each other, a plurality of turns (wherein the torsional rigidity retaining prepreg 2 includes a layer of fibers oblique to the cylindrical axis direction and the buckling prevention prepreg 3 includes a layer of fibers orthogonal to the cylindrical axis direction) is included in a process of winding a plurality of prepregs into a cylinder. In other words, this simultaneous multilayer winding process is a process of continuously winding a plurality of prepregs (three prepregs: the pair of bias prepregs 2A and 2B of torsional rigidity retaining prepreg 2 and the buckling prevention prepreg 3) around the mandrel M a plurality of turns as if this plurality of prepregs was a single prepreg (the set prepreg 1).

Figure 5:
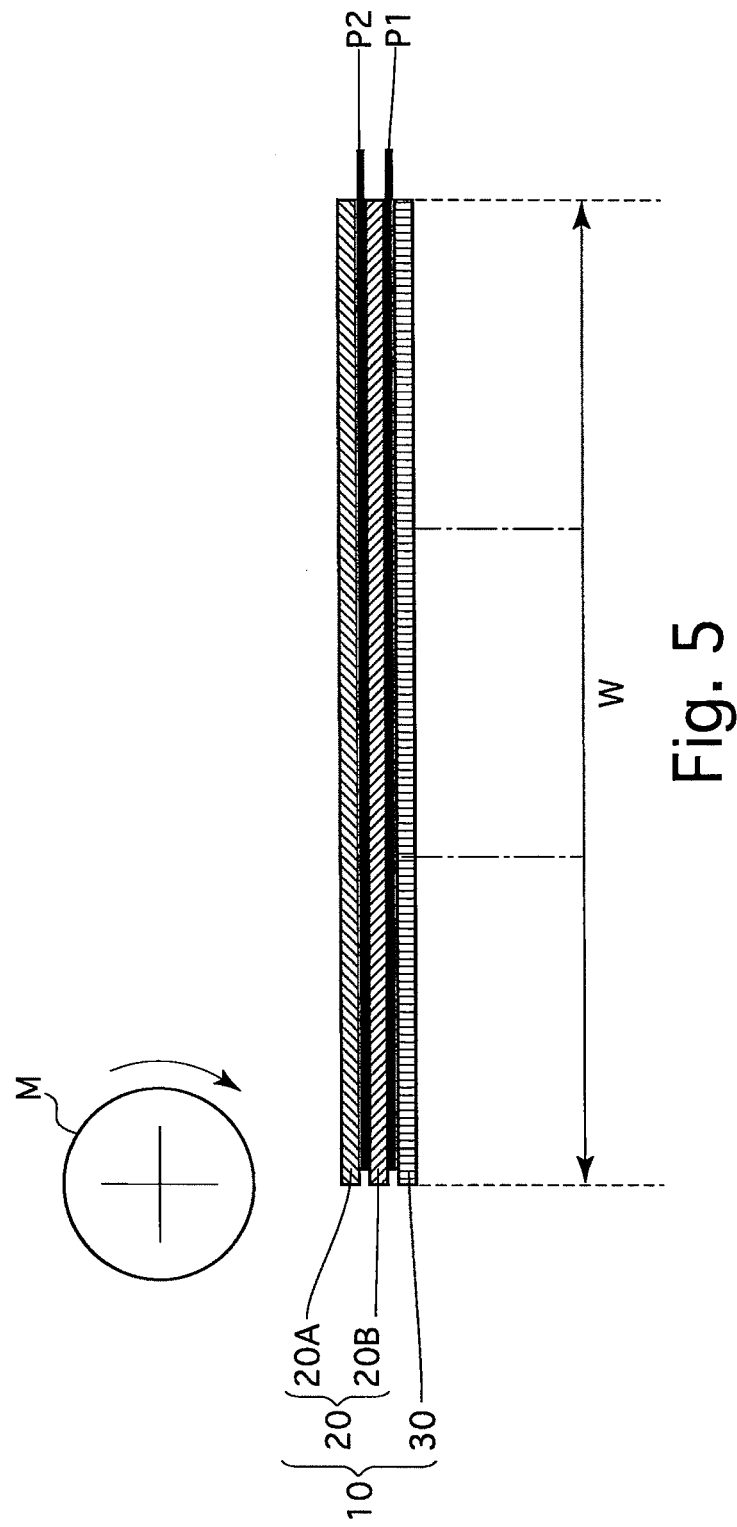
FIG. 5 is an illustration showing a simultaneously-multilayered winding layer included in an FRP cylinder made by winding layers with separating sheets sandwiched between the layers.

It is desirable that the simultaneous multilayer winding process be carried out with separating sheets being sandwiched between adjacent layers in a layered state (separating sheet winding). FIG. 5 shows this embodiment. In this embodiment, the simultaneous multilayer winding process is carried out with a separating sheet P1 sandwiched between the torsional rigidity retaining prepreg 2 (the torsional rigidity retaining layer 20) and the buckling prevention prepreg 3 (the buckling prevention layer 30) and with a separating sheet P2 sandwiched between the pair of bias prepregs 2A and 2B (the pair of bias layers 20A and 20B). A fluororesin (coating) film such as, e.g., a PTFE film or a PFA film can be used as the separating sheets P1 and P2.

According to the aforementioned separating sheet winding, the set prepreg 1 can be wound uniformly; in addition, the formability of the FRP cylinder 100 is remarkably improved, and both internal and external structures thereof can be made excellent. Accordingly, it is not necessary to either grind the surface of the FRP cylinder 100 to make it smooth by post-finishing or to paint the surface in order to improve the outward appearance of the surface of the FRP cylinder 100. The separating sheets P1 and P2 are successively removed during the operation of the simultaneous multilayer winding process (separating sheet removing process). To facilitate the separating sheet removing process, the width of each of the separating sheets P1 and P2 are set to be larger and longer than the width W of the set prepreg 10. In addition, at the winding commencement position, each of the separating sheets P1 and P2 is slightly recessed in the set prepreg 1 (the simultaneously-wound multilayer 10).

Second Embodiment

Figure 6:
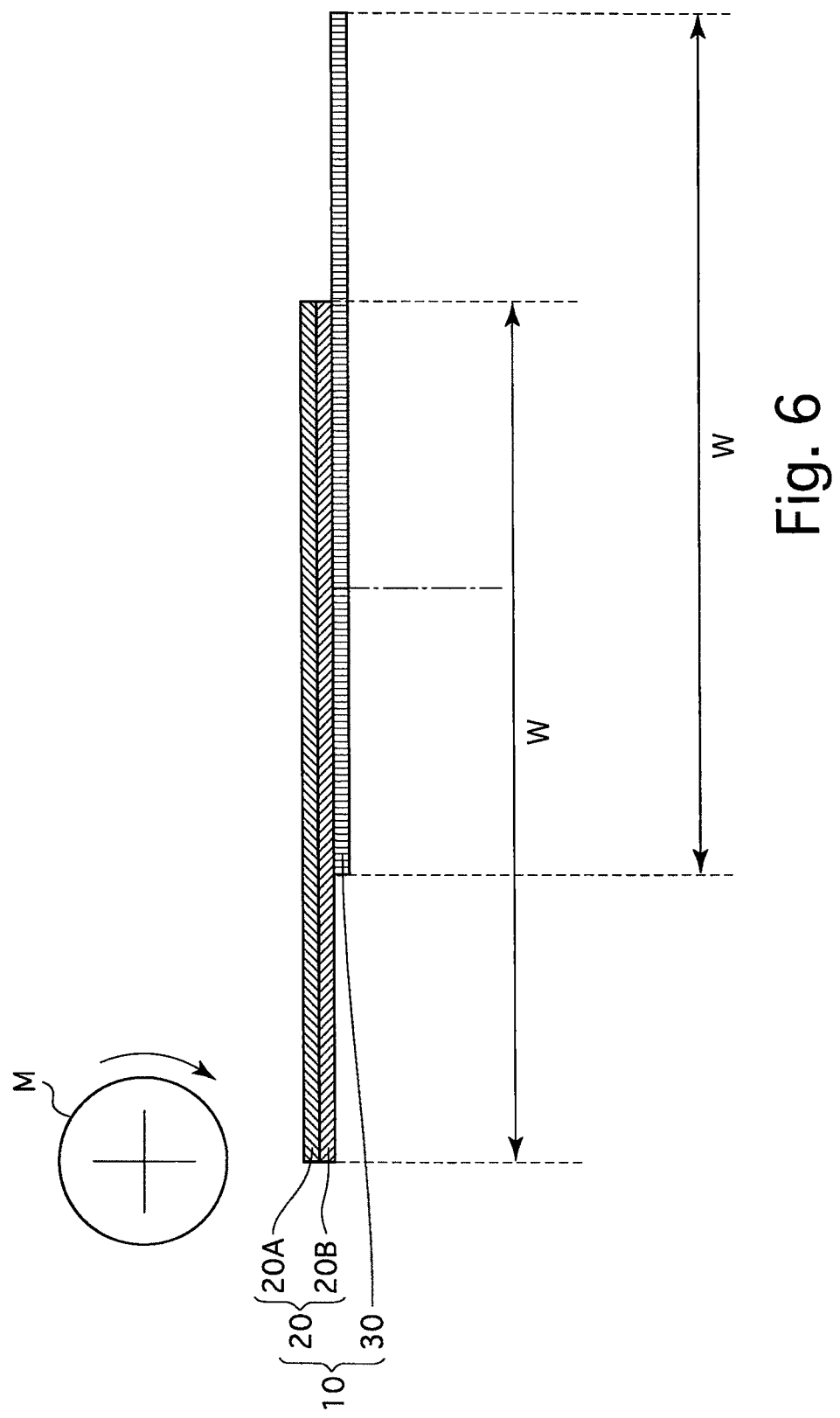
FIG. 6 is an illustration showing a simultaneously-multilayered winding layer included in an FRP cylinder pertaining to a second embodiment of the present invention.

FIG. 6 is an illustration showing a simultaneously-wound multilayer 10 included in an FRP cylinder pertaining to a second embodiment of the present invention. In this embodiment, the winding commencement positions of the torsional rigidity retaining prepreg 2 and the buckling prevention prepreg 3 of the set prepreg 1 are made to be mutually different so that the torsional rigidity retaining layer 20 and the buckling prevention layer 30 of the simultaneously-wound multilayer 10 offset from each other (offset winding). More specifically, from the point (winding commencement position) at which the torsional rigidity retaining prepreg 2 (the pair of bias prepregs 2A and 2B) has been wound into a cylinder, the torsional rigidity retaining prepreg 2 and the buckling prevention prepreg 3 are continuously wound two turns with one on top of the other. This offset winding makes it possible to enhance the buckling prevention effect in the outer layers that receive higher shear stress, thus enabling the FRP cylinder to have a higher strength.

The degree of offset between the winding commencement positions of the torsional rigidity retaining prepreg 2 and the buckling prevention prepreg 3 (offset amount) can be varied depending on the usage of the FRP cylinder. In addition, the FRP cylinder of the second embodiment can be produced in a similar manner to the FRP cylinder of the first embodiment.

Although the torsional rigidity retaining prepreg 2 and the buckling prevention prepreg 3 are offset from each other in FIG. 6, it is possible that the pair of bias prepregs 2A and 2B be offset from each other. For instance, the winding commencement positions of the following three prepregs, i.e., the pair of bias prepregs 2A and 2B and the buckling prevention prepreg 3, can be made to be mutually different. In addition, the order of overlaying these three prepregs is not limited to that shown in FIG. 6; for instance, it is possible that a buckling prevention prepreg and a pair of bias prepregs be layered in that order from the inner layer side.

Third Embodiment

Figure 7:
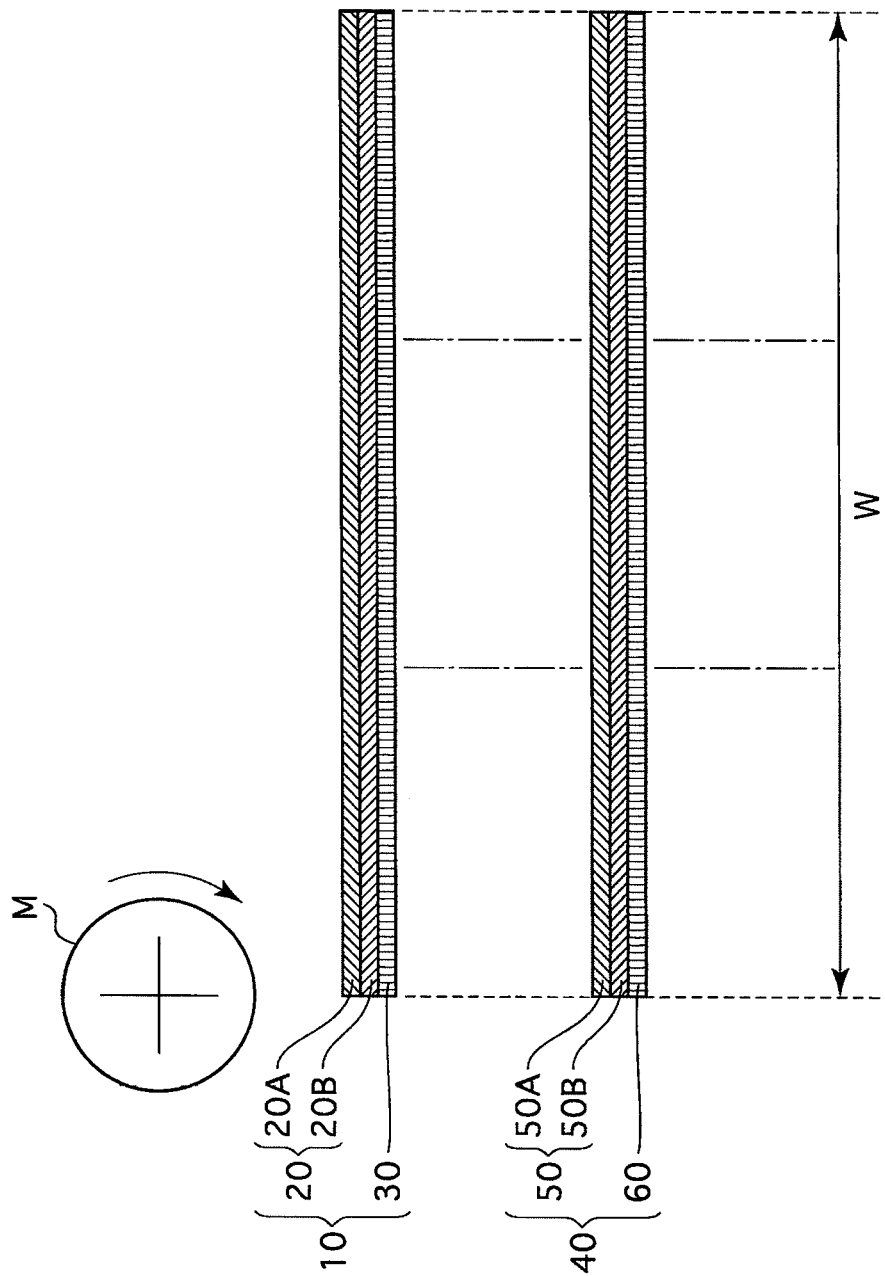
FIG. 7 is an illustration showing simultaneously-multilayered winding layers included in an FRP cylinder pertaining to a third embodiment of the present invention.
Figure 8:
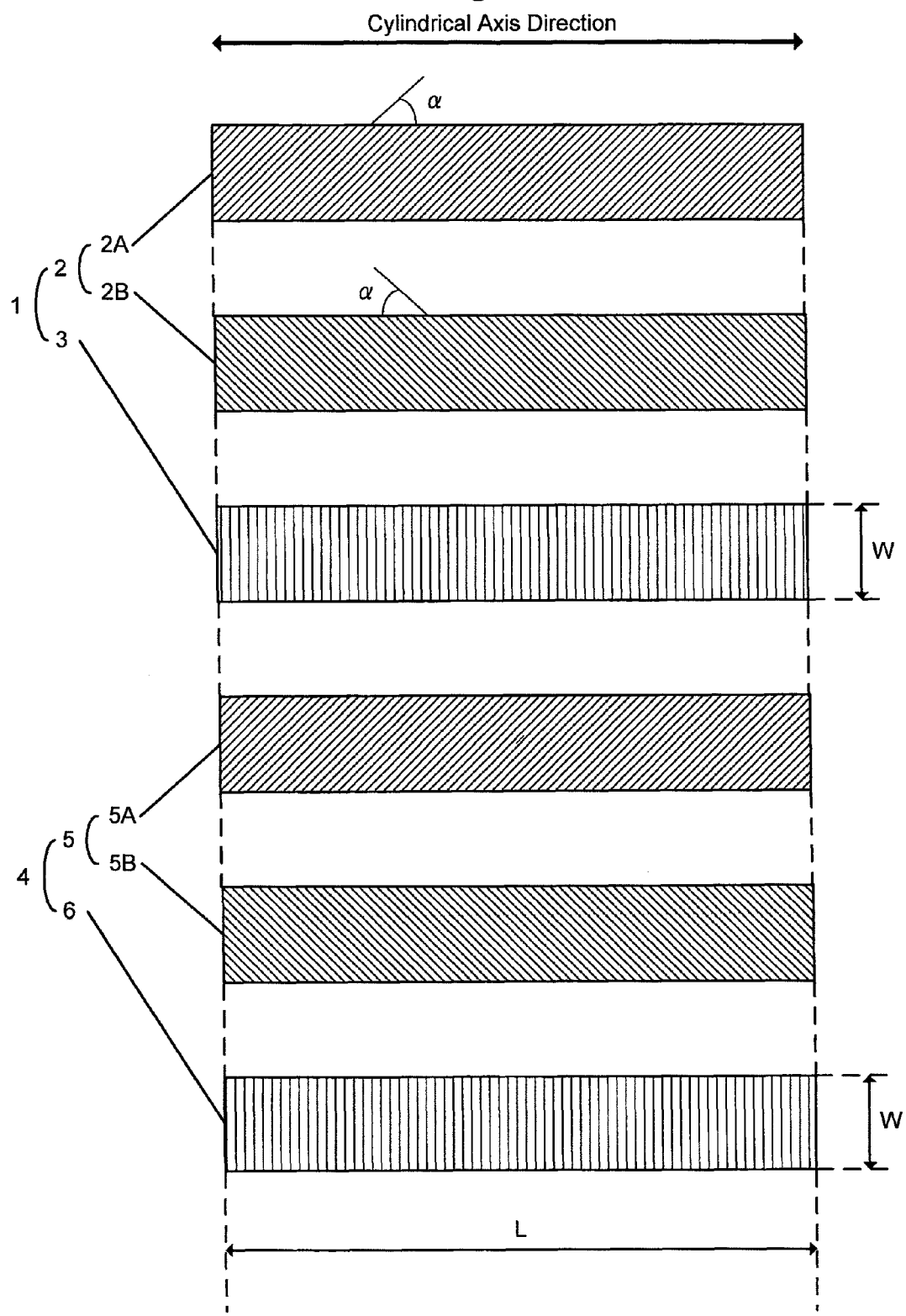
FIG. 8 is an illustration showing the structures of set prepregs which comprise the simultaneously-multilayered winding layer shown in FIG. 7.

FIG. 7 is an illustration showing a simultaneously-wound multilayer 10 included in an FRP cylinder pertaining to a third embodiment of the present invention. The FRP cylinder of this embodiment is provided with two simultaneously-wound multilayers 10 and 40 made from two set prepregs 1 and 4, respectively. The set prepreg 4 has the same structure as the set prepreg 1 of the first embodiment, and is made by layering a torsional rigidity retaining prepreg 5 that consists of a pair of bias prepregs 5A and 5B, and a buckling prevention (hoop) prepreg 6 on each other (FIG. 8). The number of plies becomes eighteen in total by continuously winding each of the two set simultaneously-wound multilayers 10 and 40 three turns.

The strength of the FRP cylinder can further be increased by making the FRP cylinder include the two simultaneously-wound multilayers 10 and 40 in the FRP layers of the FRP cylinder. The number of simultaneously-wound multilayers included in the FRP layers of the FRP cylinder can be appropriately varied depending on the usage of the FRP cylinder, and for instance it is possible that the FRP cylinder be made to include three or more simultaneously-wound multilayers in the FRP layers of the FRP cylinder. In this case, set prepregs which correspond to the number of simultaneously-wound multilayers are used.

Although the FRP cylinder of the present embodiment can also be produced in a similar manner to the FRP cylinder of the first embodiment, it is desirable that the simultaneous multilayer winding process for the set prepreg 1 and the simultaneous multilayer winding process for the set prepreg 4 be alternately carried out from mutually opposed winding directions (opposite directions). In the example shown in FIG. 7, after the set prepreg 1 is wound around the mandrel M which rotates in the clockwise direction (from left to right with respect to FIG. 7), the set prepreg 4 is wound around the mandrel M which rotates in the counterclockwise direction (from right to left with respect to FIG. 7). This enhances the uniformity of the FRP layers of the FRP cylinder in the circumferential direction, the strength of the FRP cylinder and the outward appearance thereof.

Fourth Embodiment

Figure 9:
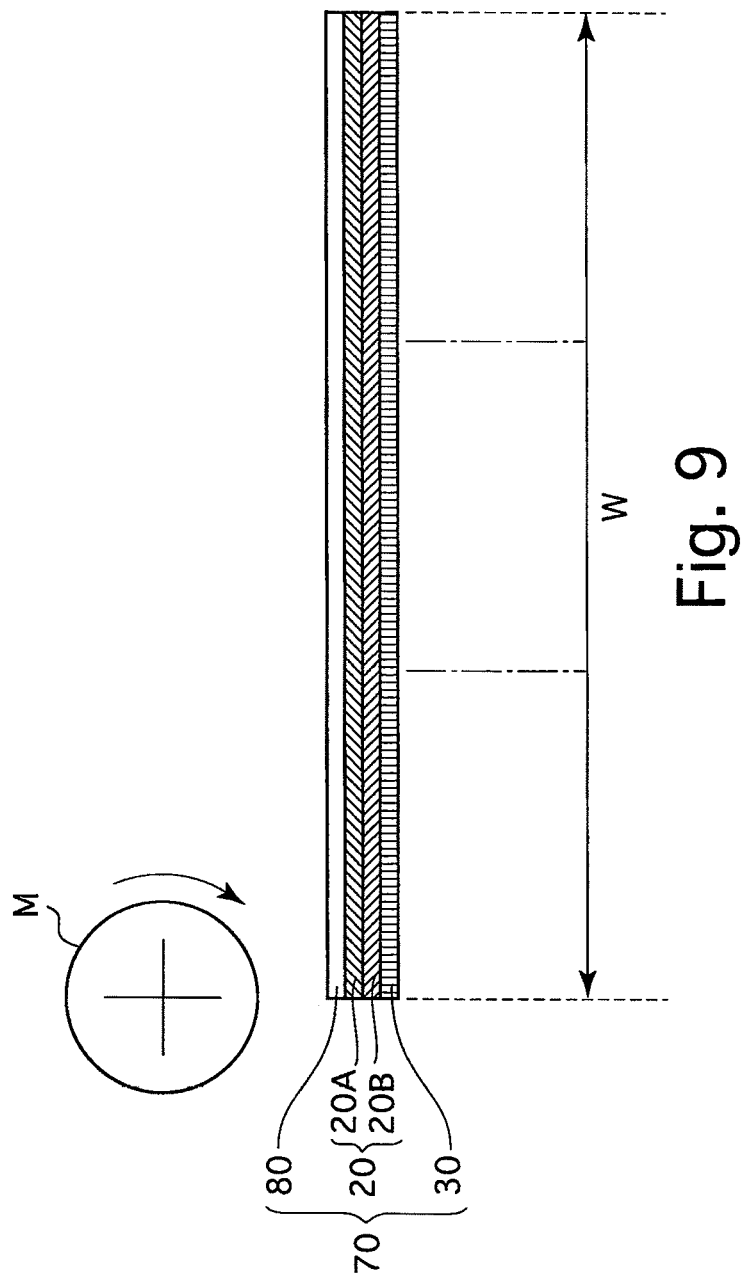
FIG. 9 is an illustration showing a simultaneously-multilayered winding layer included in an FRP cylinder pertaining to a fourth embodiment of the present invention.

FIG. 9 is an illustration showing a simultaneously-wound multilayer 70 included in an FRP cylinder pertaining to a fourth embodiment of the present invention. Elements similar to those of the first embodiment are designated by the same reference numerals and descriptions of these elements will be omitted.

The simultaneously-wound multilayer 70 is provided, in addition to the torsional rigidity retaining layer 20 and the buckling prevention layer 30, with a bending rigidity retaining layer 80 which has strength to withstand a force (bending) exerted on the FRP cylinder in a direction parallel to the cylindrical axis direction.

Figure 10:
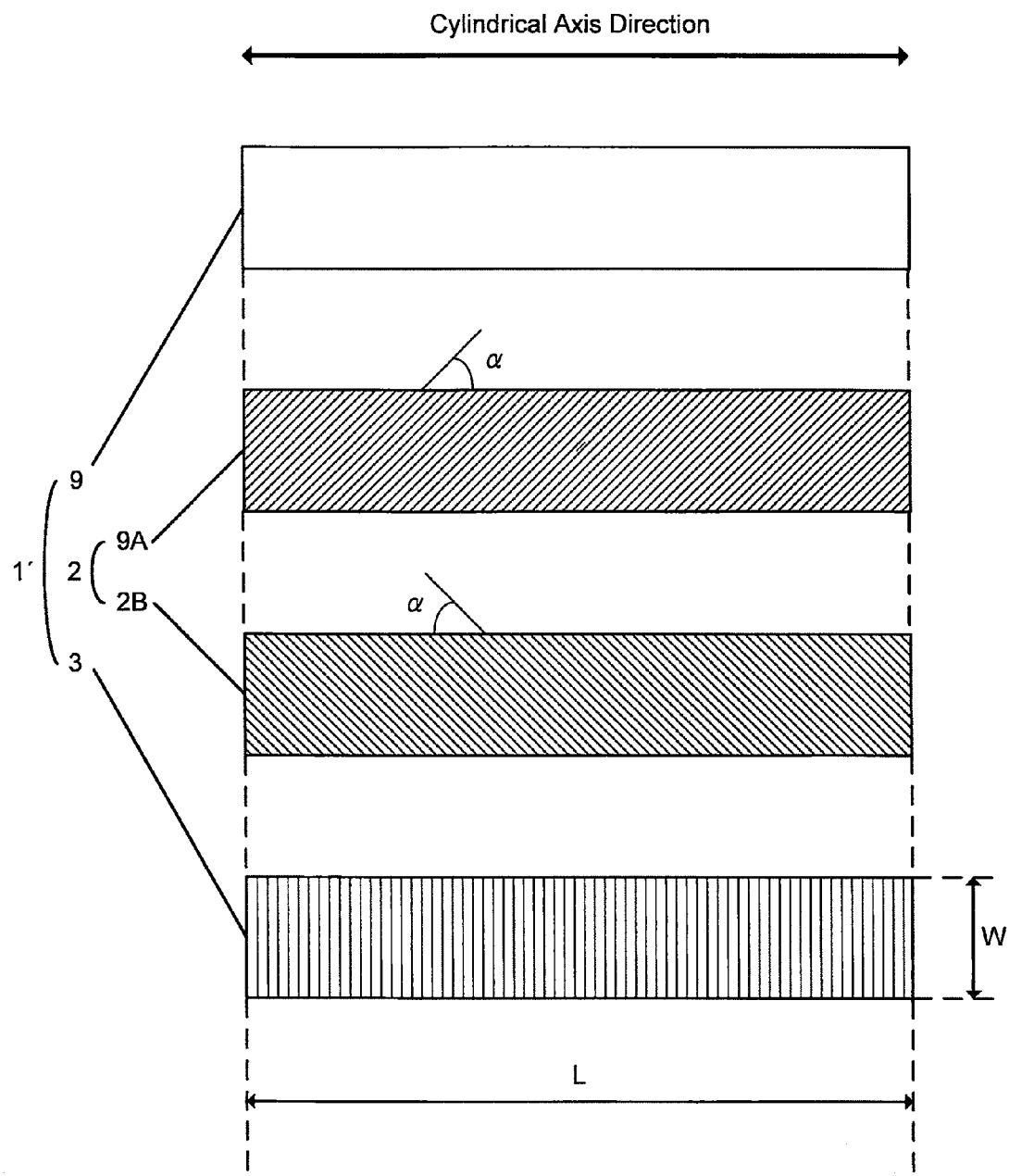
FIG. 10 is an illustration showing the structure of a set prepreg which comprises the simultaneously-multilayered winding layer shown in FIG. 9.

Namely, the simultaneously-wound multilayer 70 is configured from a set prepreg 1' which consists of a bending rigidity retaining prepreg 9, a torsional rigidity retaining prepreg 2 and a buckling prevention prepreg 3 that are layered in that order from the bottom layer (inner side) as shown in FIG. 10, and which is continuously wound a plurality of turns and thermally cured, wherein the bending rigidity retaining prepreg 9 includes a layer of fibers parallel to the cylindrical axis direction, the torsional rigidity retaining prepreg 2 includes a layer of fibers oblique to the cylindrical axis direction and the buckling prevention prepreg 3 includes a layer of fibers orthogonal to the cylindrical axis direction. The bending rigidity retaining prepreg 9 becomes a bending rigidity retaining layer 80 by being thermally cured; in this embodiment, the bending rigidity retaining prepreg 9 is a 0-degree prepreg, the filament fiber direction of which is parallel to the cylindrical axis direction. FIG. 10 shows a state before the bending rigidity retaining prepreg 9, the torsional rigidity retaining prepreg 2 and the buckling prevention prepreg 3 that constitute the set prepreg 1' are layered together to show the filament fiber direction each of these prepregs 9, 2 and 3.

The width W of the set prepreg 1' (the bending rigidity retaining prepreg 9, the torsional rigidity retaining prepreg 2 and the buckling prevention prepreg 3) is set to be approximately a little over three times the circumference of these prepregs when these prepregs are wound into a cylinder, so that the set prepreg 1' can be continuously wound three turns into a cylinder. Since the set prepreg 1' consists of the following four prepregs: the bending rigidity retaining prepreg 9, the pair of bias prepregs 2A and 2B and the hoop prepreg 3, the number of plies becomes twelve in total by continuously winding the set prepreg 1' by three turns.

Figure 11:
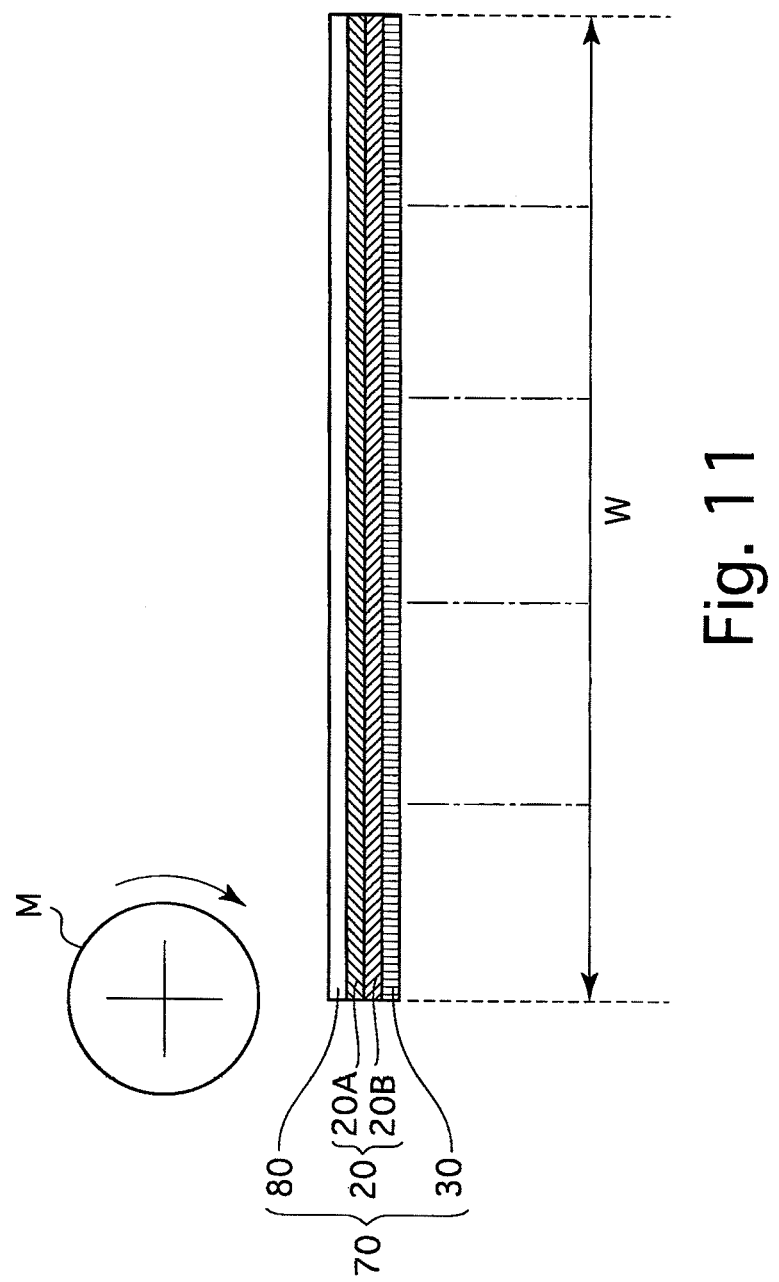
FIG. 11 is an illustration showing a simultaneously-multilayered winding layer in the case where the number of turns of the set prepreg is changed.

The number of turns of the set prepreg 1' that is continuously wound into a cylinder is not limited to three and can be modified as appropriate. For instance, as shown in FIG. 11, the number of plies becomes twenty in total by continuously winding the set prepreg 1' five turns into a cylinder.

According to an FRP cylinder provided in the FRP layers thereof with the simultaneously-wound multilayer 70 that is configured as described above, a strength with respect to bending direction, together with a strength with respect to torsional direction and buckling direction, can be given to the FRP cylinder. The FRP cylinder 100 that has such properties is suitable for use as a stabilizer bar or an anti-roll bar for an automobile.

The simultaneously-wound multilayer 70 of the present embodiment can also be produced in a similar manner to the first embodiment. In addition, two or more simultaneously-wound multilayers 70 can be provided; in this case, it is desirable that these set prepregs 1' be alternately wound from mutually opposed winding directions.

Fifth Embodiment

Figure 12:
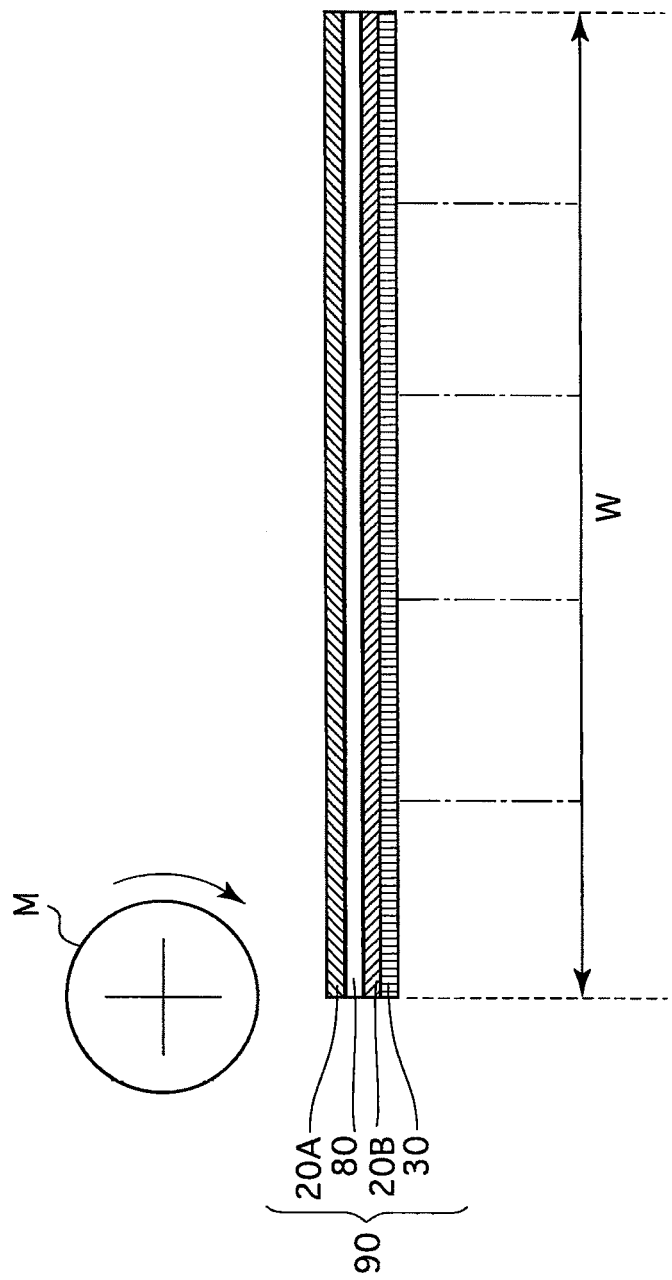
FIG. 12 is an illustration showing a simultaneously-multilayered winding layer included in an FRP cylinder pertaining to a fifth embodiment of the present invention.

FIG. 12 is an illustration showing a simultaneously-wound multilayer 90 included in an FRP cylinder pertaining to a fifth embodiment of the present invention. The simultaneously-wound multilayer 90 is provided with a first bias layer 20A which has strength to withstand a force (torsion) exerted on the FRP cylinder in directions oblique to the cylindrical axis direction, a bending rigidity retaining layer 80 which has strength to withstand a force (bending) exerted on the FRP cylinder in a direction parallel to the cylindrical axis direction, a second bias layer 20B which has strength to withstand a force (torsion) exerted on the FRP cylinder in directions oblique to the cylindrical axis direction, and a buckling prevention layer 30 which has strength to withstand a force (buckling) exerted on the FRP cylinder in directions orthogonal to the cylindrical axis direction.

Figure 13:
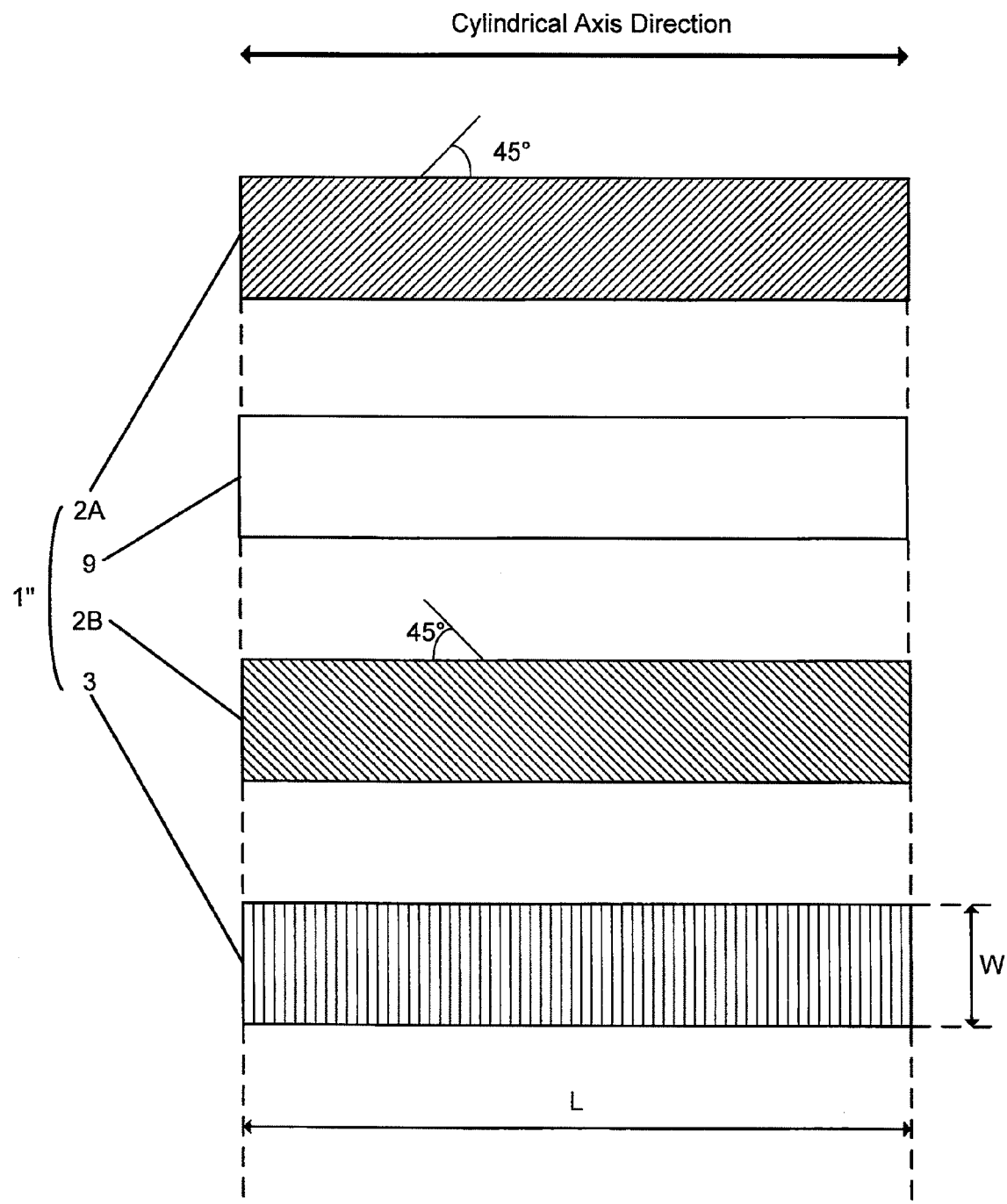
FIG. 13 is an illustration showing the structure of a set prepreg which comprises the simultaneously-wound multilayer shown in FIG. 12.

More specifically, the simultaneously-wound multilayer 90 is configured from a set prepreg 1" which consists of a bias prepreg 2A, a bending rigidity retaining prepreg 9, a bias prepreg 2B and a buckling prevention prepreg 3 that are layered in that order from the bottom layer (inner side) as shown in FIG. 13, and which is continuously wound a plurality of turns and thermally cured, wherein the filament fiber direction of the bias prepreg 2A is inclined to the cylindrical axis direction at an angle of +45 degrees, the bending rigidity retaining prepreg 9 has a layer of fibers parallel to the cylindrical axis direction, the filament fiber direction of the bias prepreg 2B is inclined to the cylindrical axis direction at an angle of −45 degrees, and the buckling prevention prepreg 3 includes a layer of fibers orthogonal to the cylindrical axis direction. FIG. 13 illustrates a state before the bias prepreg 2A, the bending rigidity retaining prepreg 9, the bias prepreg 2B and the buckling prevention prepreg 3 are layered together to show the fiber direction of each of these prepregs 2A, 9, 2B and 3 that constitute the set prepreg 1".

The width W of the set prepreg 1" (the bias prepreg 2A, the bending rigidity retaining prepreg 9, the bias prepreg 2B and the buckling prevention prepreg 3) is set to be approximately a little over five times the circumference of these prepregs when these prepregs are wound into a cylinder, and the number of plies becomes twenty in total by continuously winding the set prepreg 1" five turns.

According to an FRP cylinder, provided in the FRP layers thereof with the simultaneously-wound multilayer 90, that is configured as described above, the differences in angle between adjacent prepregs (the bias prepreg 2A and the bending rigidity retaining prepreg 9, the bending rigidity retaining prepreg 9 and the bias prepreg 2B, and the bias prepreg 2B and the buckling prevention prepreg 3) are all 45 degrees, which reduces the difference in distortion between layers, thus making it possible to prevent the occurrence to peeling/flaking between layers.

The simultaneously-wound multilayer 90 of this embodiment can also be produced in a similar manner to the first embodiment. In addition, two or more simultaneously-wound multilayers 90 can be provided; in this case, it is desirable that set prepregs 1" be alternately wound from mutually opposed winding directions.

Sixth Embodiment

Figure 14:
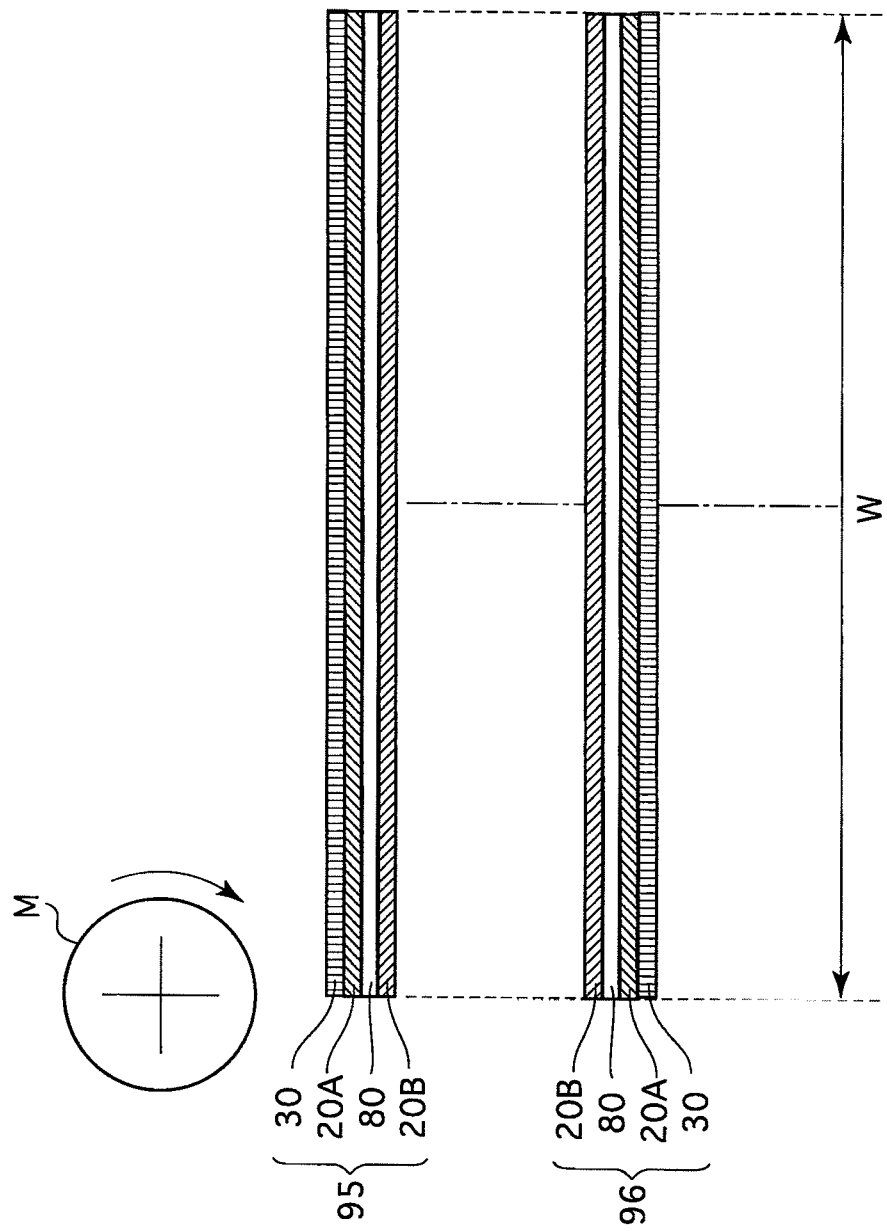
FIG. 14 is an illustration showing simultaneously-wound multilayers included in an FRP cylinder pertaining to a sixth embodiment of the present invention.

FIG. 14 is an illustration showing simultaneously-wound multilayers included in an FRP cylinder pertaining to a sixth embodiment of the present invention. The FRP cylinder of this embodiment is provided with two simultaneously-wound multilayers 95 and 96 that are configured from two set prepregs 1X and 1Y, respectively.

Figure 15:
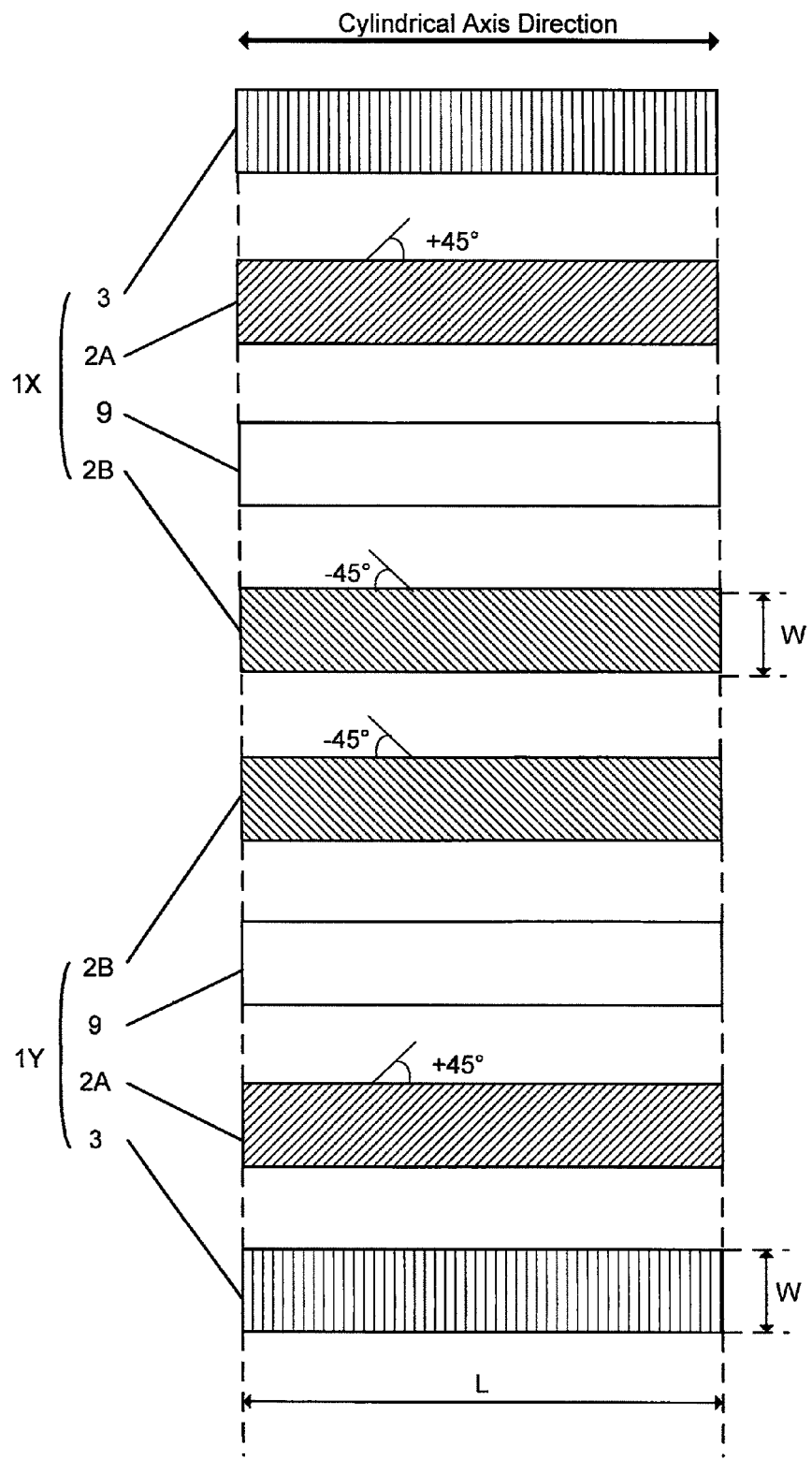
FIG. 15 is an illustration showing the structures of set prepregs which comprise the simultaneously-wound multilayer shown in FIG. 14.

As shown in FIG. 15, the simultaneously-wound multilayer 95 is configured from the set prepreg 1X which consists of a buckling prevention prepreg 3, a bias prepreg 2A, a bending rigidity retaining prepreg 9 and a bias prepreg 2B that are layered in that order from the bottom layer (inner side) as shown in FIG. 15, and which is continuously wound a plurality of turns and thermally cured, wherein the buckling prevention prepreg 3 includes a layer of fibers orthogonal to the cylindrical axis direction, the filament fiber direction of the bias prepreg 2A is inclined to the cylindrical axis direction at an angle of +45 degrees, the bending rigidity retaining prepreg 9 has a layer of fibers parallel to the cylindrical axis direction, and the filament fiber direction of the bias prepreg 2B is inclined to the cylindrical axis direction at an angle of −45 degrees. On the other hand, the simultaneously-wound multilayer 96 is configured from the set prepreg 1Y which consists of a bias prepreg 2B, a bending rigidity retaining prepreg 9, a bias prepreg 2A and a buckling prevention prepreg 3 that are layered in that order from the bottom layer (inner side), and which is continuously wound a plurality of turns and thermally cured. Namely, the layered structure of the set prepreg 1X (the simultaneously-wound multilayer 95) from the lower layer (inner side) toward the upper layer (outer side) and the layered structure of the set prepreg 1Y (the simultaneously-wound multilayer 96) from the upper layer (outer side) toward the lower layer (inner side) are mutually identical.

Figure 16:
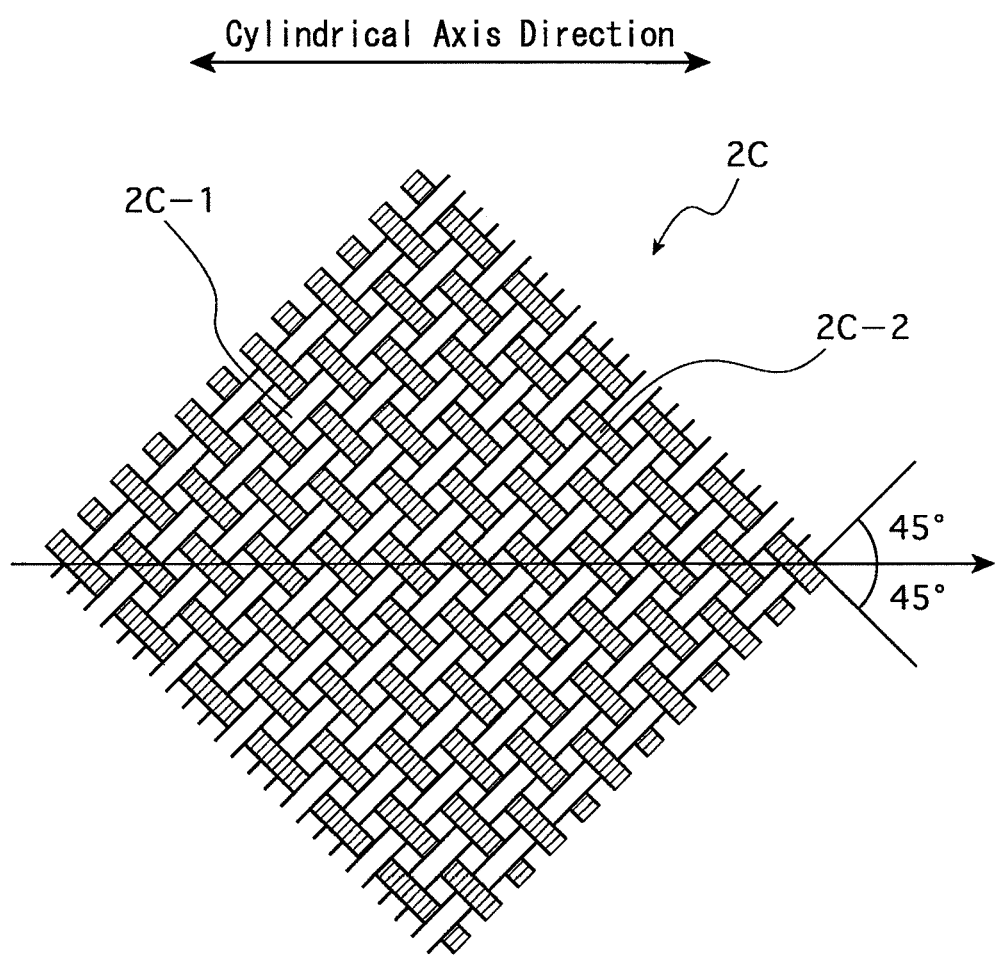
FIG. 16 is an illustration showing the structure of a plain weave fabric prepreg as a torsional rigidity retaining prepreg.

In each of the above described embodiments, a plain weave fabric (biaxial woven fabric) prepreg 2C which is made from a plain weave fabric impregnated with a thermosetting resin sheet as shown in FIG. 16 can be used as the torsional rigidity retaining prepreg 2 instead of the pair of bias prepregs 2A and 2B. In this embodiment, the plain weave fabric prepreg 2C is set so that a pair of fiber yarns 2C-1 and 2C-2 cross symmetrically with respect to the cylindrical axis direction at symmetric angles (e.g., ±45 degrees).

Figure 17:
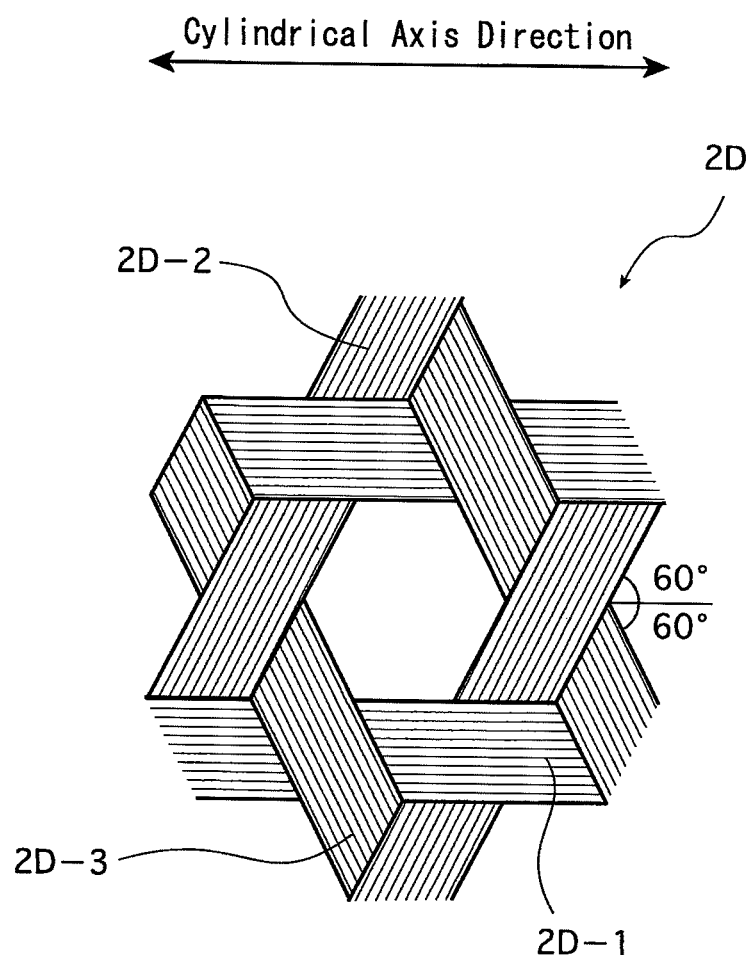
FIG. 17 is a first illustration showing the structure of a triaxial woven fabric prepreg as a torsional rigidity retaining prepreg.
Figure 18:
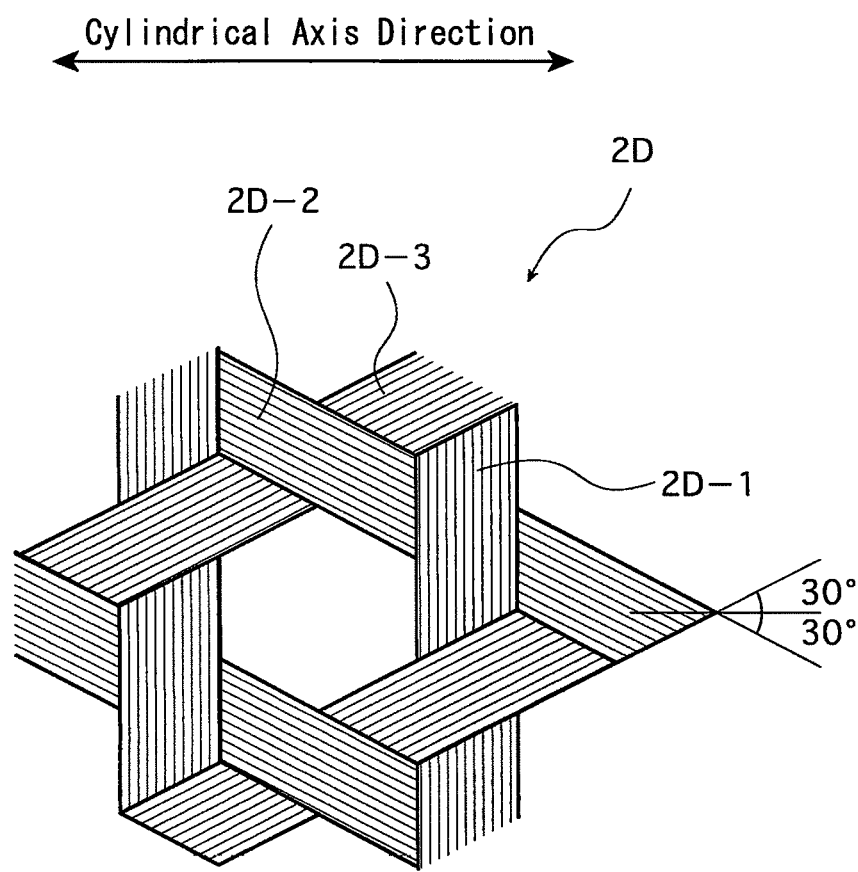
FIG. 18 is a second illustration showing the structure of a triaxial woven fabric prepreg as a torsional rigidity retaining prepreg.

In addition, a triaxial woven fabric prepreg 2D, which is made from a triaxial woven fabric impregnated with a thermosetting resin sheet as shown in FIG. 17, can be used as the torsional rigidity retaining prepreg 2. In this embodiment, the triaxial woven fabric prepreg 2D is set so that weft 2D-1 is parallel to the cylindrical axis direction and so that a pair of warps 2D-2 and 2D-3 cross symmetrically with respect to the cylindrical axis direction at symmetric angles (e.g., ±60 degrees). On the other hand, as shown in FIG. 18, the triaxial woven fabric prepreg 2D can also be set so that the weft 2D-1 is orthogonal to the cylindrical axis direction and so that the pair of warps 2D-2 and 2D-3 cross symmetrically with respect to the cylindrical axis direction at symmetric angles (e.g., ±30 degrees).

Figure 19:
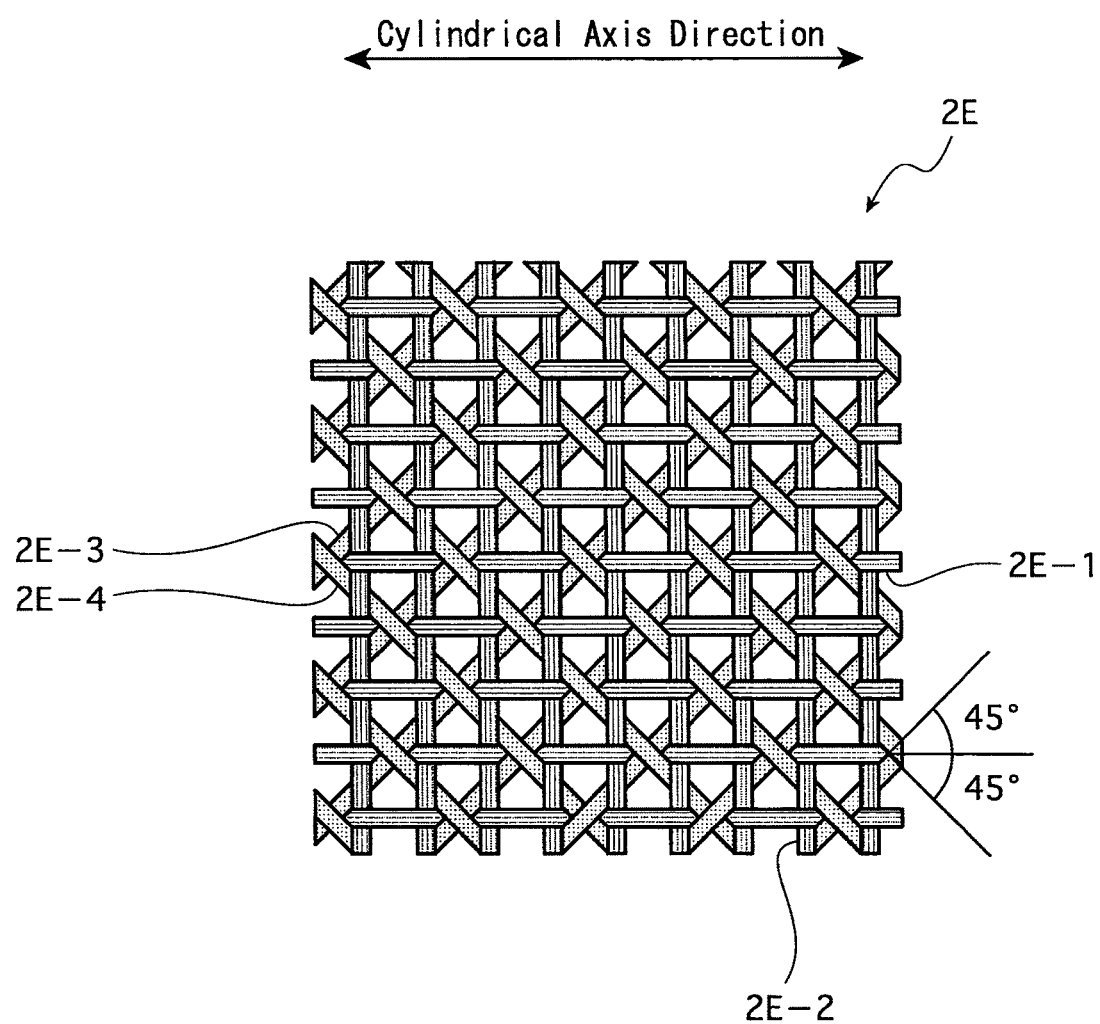
FIG. 19 is an illustration showing the structure of a tetra-axial woven fabric prepreg as a torsional rigidity retaining prepreg or a buckling prevention prepreg.

In addition, a tetra-axial woven fabric prepreg 2E which is made from a tetra-axial woven fabric impregnated with a thermosetting resin sheet as shown in FIG. 19 can be used as the torsional rigidity retaining prepreg 2. In this embodiment, the tetra-axial woven fabric prepreg 2E is set so that horizontal yarn 2E-1 is parallel to the cylindrical axis direction, so that vertical yarn 2E-2 is orthogonal to the cylindrical axis direction and so that a pair of oblique yarns 2E-3 and 2E-4 cross symmetrically with respect to the cylindrical axis direction at symmetric angles (e.g., ±45 degrees).

Figure 20:
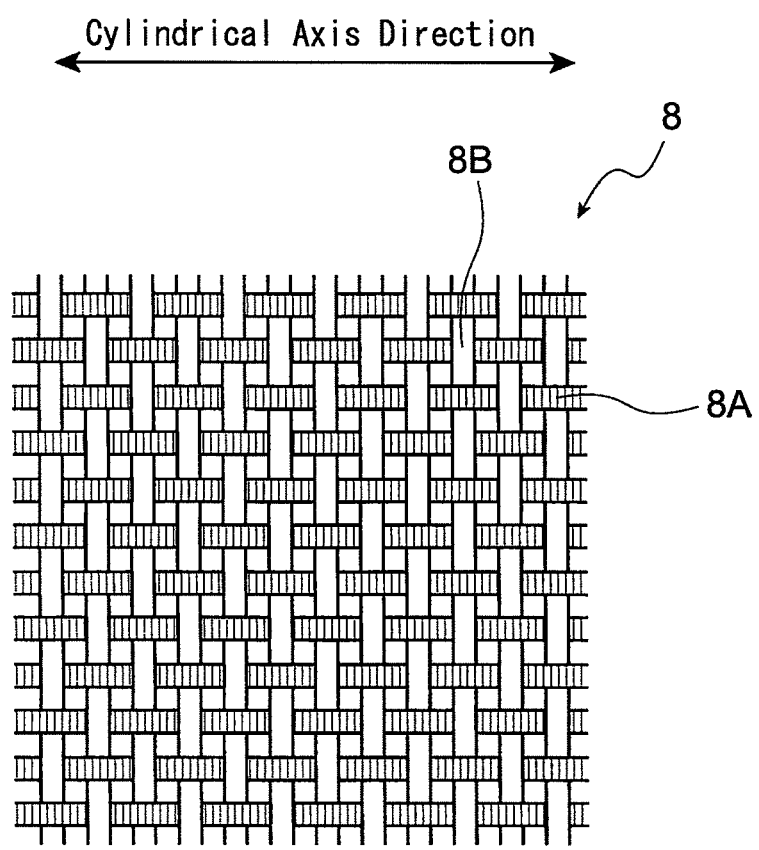
FIG. 20 is an illustration showing the structure of a plain weave fabric prepreg as a buckling prevention layer.

Note that a plain weave fabric (biaxial woven fabric) prepreg 8 which is made from a plain weave fabric impregnated with a thermosetting resin sheet as shown in FIG. 20 can be used as the buckling prevention prepreg 3 instead of the hoop prepreg. The plain weave fabric prepreg 8 is set so that a pair of fiber yarns 8A and 8B are parallel (orthogonal) to the cylindrical axis direction at symmetric angles (0 degree and 90 degrees). In addition, as the buckling prevention prepreg 3, the tetra-axial woven fabric prepreg 2E shown in FIG. 19 can also be used instead.

In the case of reinforced fiber prepregs having a textile structure such as that of the aforementioned plain weave fabric prepreg 2C, triaxial woven fabric prepreg 2D, tetra-axial woven fabric prepreg 2E or plain weave fabric prepreg 8, the thread thickness is desirably smaller than 6K. If the thread thickness exceeds 6K, the thickness of the prepreg becomes excessively great, and a uniform fabric property (physical property) may not be ensured; in addition, the workability of winding the prepreg around a mandrel during manufacturing may deteriorate.

PRACTICAL EXAMPLES

First Practical Example

In the first practical example, the inventors of the present invention prototyped four types of FRP cylinders: Types A to D, to compare FRP cylinders according to the present invention with FRP cylinders having conventional structures. FIG. 21 is a diagram for illustrating the multilayer winding structure of each type of FRP cylinder, and in FIG. 21 each area surrounded by a thick-bordered box represents one FRP layer.

Types A and B each correspond to an FRP cylinder having the structure of the third embodiment; in Type A, separating sheets are sandwiched by simultaneous multilayer winding, and in Type B no separating sheets are sandwiched by simultaneous multilayer winding. Each of Types A and B has two simultaneously-wound multilayers that are configured from two layers of set prepregs, each of which consists of a pair of bias prepregs (±45 degrees) and a hoop prepreg (90 degrees) that are layered in that order from the innermost layer side toward the outermost layer side, and which is continuously wound three turns (nine plies) and thermally cured (18 plies in total). In FIG. 21, these two set prepregs are shown as shaded areas. The inner diameter $\phi$ is 33.5 mm, the outer diameter $\Phi$ is 38.7 mm, the length L is 330.2 mm and the weight of the produced FRP cylinder is approximately 150 g.

Types C and D each correspond to an FRP cylinder having a conventional general structure (not the simultaneous multilayer winding type). Type C is provided with alternately-arranged three layer sets, each set of which consists of an FRP layer and another FRP layer that are layered from the innermost layer side toward the outermost layer side, wherein the former FRP layer is made of only a pair of bias prepregs (±45 degrees) wound two turns into a cylinder (four plies), and wherein the latter FRP layer is made of only a hoop prepreg (90 degrees) wound two turns into a cylinder (two plies) (eighteen plies in total). Type D is provided with two first type FRP layers and two second type FRP layers that are layered from the innermost layer side toward the outermost layer side, wherein each first type FRP layer is made of only a pair of bias prepregs (±45 degrees) wound three turns into a cylinder (six plies), and wherein each second type FRP layer is made of only a hoop prepreg (90 degrees) three turns into a cylinder (three plies) (eighteen plies in total).

The inventors of the present invention conducted torsion rupture tests on the prototyped Types A to D of the FRP cylinders and have demonstrated the superiority in torsional strength of the FRP cylinders (Types A and B) produced according to the present invention. The torsion rupture test was carried out twice for each type of FRP cylinder.

The torsion rupture test was conducted in a manner which will be discussed hereinafter. Each test piece was loaded into a hydraulic torsion rupture testing device, one end is securely locked, and angular displacements are given to the other end with a sine wave having an amplitude of ±45 degrees at a speed of 0.02 Hz. The torsional strength was measured with a torque detector installed at the securely locked end. The torsion angle was measured by an encoder fixed to a shaft at the displacement end.

Table 1 below shows results of the torsion rupture test for the prototyped Types A to D of FRP cylinders. Types A and B, which are configured according to the present invention, have a higher torsional strength than conventional Types C and D by an average of over 100 Nm, which proves the superiority of the simultaneous multilayer winding of the present invention. When Type A and Type B are compared with each other, Type A has a higher torsional strength than Type B by an average of as much as 180 Nm, which proves the superiority of the separating sheet winding.

TABLE 1

| PROTO-TYPE | MEASUREMENT RESULT AT FIRST TEST (kNm) | MEASUREMENT RESULT AT SECOND TEST (kNm) | AVERAGE (kNm) |
| --- | --- | --- | --- |
| TYPE A | 2.06 | 1.98 | 2.02 |
| TYPE B | 1.83 | 1.85 | 1.84 |
| TYPE C | 1.64 | 1.78 | 1.71 |
| TYPE D | 1.76 | 1.72 | 1.74 |

In addition, when Type A and Type B are compared with each other, Type A has a surface shape far smoother than that of Type B, and from the outward appearances of Types A and B it was obvious that there was a difference in formability therebetween. Additionally, from comparison between the internal state of Type A with the internal state of Type B after polishing, Type A has a more uniform internal structure than Type B, which proves the superiority of the separating sheet winding.

Second Practical Example

In the second practical example, the inventors of the present invention prototyped three types of FRP cylinders: Types E, F and G. FIG. 22 is a diagram illustrating the multilayer winding structure of each type of FRP cylinder, and in FIG. 22, each area surrounded by a thick-bordered box represents one FRP layer.

Type E corresponds to an FRP cylinder having the structure of the fourth embodiment (FIG. 11) and has a simultaneously-wound multilayer that is configured from a set prepreg which consists of a 0-degree prepreg, a pair of bias prepregs (±45 degrees) and a hoop prepreg (90 degrees) that are layered in that order from the innermost layer side toward the outermost layer side, and which is continuously wound five turns and thermally cured (20 plies in total).

Type F corresponds to an FRP cylinder having the structure of the fifth embodiment (FIG. 13) and has a simultaneously-wound multilayer that is configured from a set prepreg which consists of a bias prepreg (+45 degrees), a 0-degree prepreg, a bias prepreg (−45 degrees) and a hoop prepreg (90 degrees) that are layered in that order from the innermost layer side toward the outermost layer side, and which is continuously wound five turns and thermally cured (20 plies in total).

Type G corresponds to an FRP cylinder having a conventional general structure (not the simultaneous multilayer winding type). Type G is made of two plies of a 0-degree prepreg, two plies of a pair of bias prepregs (±45 degrees) (four plies), two plies of a hoop prepreg (90 degrees), three plies of a 0-degree prepreg, three plies of a pair of bias prepregs (±45 degrees) (six plies) and three plies of a hoop prepreg (90 degrees) (twenty plies in total).

The inventors of the present invention conducted torsion rupture tests for the prototyped Types E, F and G of FRP cylinders, and have demonstrated the superiority in torsional strength and torsional rigidity of the FRP cylinders (Types E and F) that were produced according to the present invention. The torsion rupture test was carried out in a similar manner to the first practical example.

Table 2 below shows results of the torsion rupture test for the prototyped Types E, F and G of FRP cylinders. As compared with Type G having a conventional structure, Type E that is configured according to the present invention exhibits a higher torsional strength by 90 Nm and a higher torsional rigidity by 20 Nm². Although Types E and G are mutually identical in calculated strength according to CLT (Classical Lamination Theory), Type E exhibits a higher torsional strength and a higher torsional rigidity than Type G, thus proving the superiority of the simultaneous multilayer winding. In addition, Type F that is configured according to the present invention has a lower torsional rigidity than Type G that has a conventional structure by 10 Nm²; however, Type F exhibits a higher torsional strength than Type G by 120 Nm.

TABLE 2

| PROTO-TYPE | measured value torsional strength (kNm) | measured value torsional rigidity (kNm$^2$) | CLT calculated value torsional strength (kNm) | CLT calculated value torsional rigidity (kNm$^2$) | strength incidence rate (measured value/ CLT value) |
| --- | --- | --- | --- | --- | --- |
| TYPE E | 1.79 | 2.15 | 1.97 | 1.89 | 0.91 |
| TYPE F | 1.82 | 2.12 | 2.02 | 1.87 | 0.90 |
| TYPE G | 1.70 | 2.13 | 1.97 | 1.89 | 0.86 |

Third Practical Example

In the third practical example, the inventors of the present invention prototyped two types of FRP cylinders: Types H and I. FIG. 23 is a diagram for illustrating the multilayer winding structure of each type of FRP cylinder, and in FIG. 23, each area surrounded by a thick-bordered box represents one FRP layer.

Type H corresponds to an FRP cylinder having the structure of the fourth embodiment (FIG. 9) and has a simultaneously-wound multilayer that is configured from a set prepreg which consists of a 0-degree prepreg, a pair of bias prepregs (±45 degrees) and a hoop prepreg (90 degrees) that are layered in that order from the innermost layer side toward the outermost layer side, and which is continuously wound three turns and thermally cured (12 plies in total).

Type I corresponds to an FRP cylinder having a conventional general structure (not the simultaneous multilayer winding type). Type I is made of three plies of a 0-degree prepreg, three plies of a pair of bias prepregs (±45 degrees) (six plies) and three plies of a hoop prepreg (90 degrees) (twelve plies in total).

The inventors of the present invention conducted bending fracture tests for the prototyped Types H and I of FRP cylinders and have demonstrated the superiority in bending strength and bending rigidity of the FRP cylinder (Type H) produced according to the present invention.

The bending fracture test was conducted with a tensile and compression universal testing device equipped with a 4-point bending test jig in a manner which will be discussed hereinafter. A cylindrical test piece which is 700 mm in length was made, and the bending fracture test was performed thereon at a load speed of 5 mm per minute with a distance between support points of 600 mm and an interload point distance of 200 mm. A metal core having a length of 20 mm was loaded immediately below each of the support points for the purpose of prevention of cross-section deformation. A strain gauge was installed to the test piece, and the bending strength and the bending rigidity thereof were determined from the measured distortion and the load of a load cell installed to the crosshead.

Table 3 below shows results of the bending fracture test for the prototyped Types H and I of FRP cylinders. As compared with Type I having a conventional structure, Type H that is configured according to the present invention exhibits a higher bending strength by 3.55 kNm and a higher bending rigidity by 0.77 kNm$^2$. In this manner, it has been proven that the bending strength and the bending rigidity are also improved by making a set prepreg include a bending rigidity retaining prepreg (by making a simultaneously-wound multilayer include a bending rigidity retaining prepreg).

TABLE 3

| PROTO-TYPE | bending strength measured value (kNm) | bending rigidity measured value (kNm$^2$) |
|---|---|---|
| TYPE H | 11.14 | 3.44 |
| TYPE I | 7.59 | 2.67 |

INDUSTRIAL APPLICABILITY

The FRP cylinder according to the present invention can be widely utilized in various industrial fields as, e.g., a propeller shaft, a drive shaft, stabilizer bar or an anti-roll bar for an automobile.

DESCRIPTION OF THE REFERENCE NUMERALS 1, 1', 1", 1X, 1Y, 4 Set prepreg
2, 5 Torsional rigidity retaining prepreg
2A,2B, 5A,5B Pair of bias prepregs
2C Plain weave fabric prepreg as torsional rigidity retaining prepreg
2D Triaxial woven fabric prepreg as torsional rigidity retaining prepreg
2E Tetra-axial woven fabric prepreg as torsional rigidity retaining prepreg or buckling prevention prepreg
3, 6 Buckling prevention prepreg
7 Burst prevention prepreg
8 Plain weave fabric prepreg as buckling prevention prepreg
9 0-degree prepreg as bending rigidity retaining prepreg
10, 40, 70, 90, 95, 96 Simultaneously-wound multilayer
20, 50 Torsional rigidity retaining layers
20A,20B, 50A,50B Pair of bias layers
30, 60 Buckling prevention layer
80 Bending rigidity retaining layer
100 FRP cylinder
M Rod-shaped (column-shaped) mandrel

The invention claimed is:

1. A method for producing an FRP cylinder, wherein a plurality of rectangular prepregs formed by impregnating reinforced fibers with thermosetting resin sheets are wound into a cylinder and thermally cured to be formed as a plurality of FRP layers, said method comprising:

a simultaneous multilayer winding process in which a torsional rigidity retaining prepreg and a buckling prevention prepreg are continuously wound by a plurality of turns while being layered on each other when said plurality of prepregs are wound into an FRP cylinder having a constant diameter along a cylindrical axis direction of said FRP cylinder, wherein said torsional rigidity retaining prepreg includes a layer of fibers oblique to said cylindrical axis direction, wherein said buckling prevention prepreg includes a layer of fibers orthogonal to said cylindrical axis direction, and wherein said simultaneous multilayer winding process is performed at least two times alternately in mutually opposed winding directions.

2. The method as claimed in claim 1, wherein said simultaneous multilayer winding process is performed with a separating sheet sandwiched between adjacent prepregs in a layered state, and wherein said separating sheet is removed during said simultaneous multilayer winding process.

3. The method as claimed in claim 1, wherein said torsional rigidity retaining prepreg and said buckling prevention prepreg are continuously wound by said plurality of turns with a bending rigidity retaining prepreg which includes a layer of fibers parallel to said cylindrical axis direction being further layered on said torsional rigidity retaining prepreg and said buckling prevention prepreg.

4. The FRP cylinder producing method according to claim 3, wherein each of said plurality of prepregs wound in said simultaneous multilayer winding process has the same length in said cylindrical axis direction, and wherein said plurality of prepregs are overlaid one over another throughout a length of said FRP cylinder in said cylindrical axis direction.

* * * * *